United States Patent [19]

Fujita et al.

[11] Patent Number: 5,544,052
[45] Date of Patent: Aug. 6, 1996

[54] DIGITAL CARTOGRAPHIC SYSTEM FOR GEOGRAPHICAL INFORMATION PROCESSING

[75] Inventors: Takehiro Fujita, Kokubunji; Shigeru Kakumoto, Kodaira; Yasuei Nomoto, Katsuta, all of Japan

[73] Assignee: Hitachi, Ltd., Tokyo, Japan

[21] Appl. No.: 396,328

[22] Filed: Feb. 28, 1995

Related U.S. Application Data

[63] Continuation of Ser. No. 870,904, Apr. 20, 1992, abandoned.

[30] Foreign Application Priority Data

Apr. 19, 1991 [JP] Japan .................... 3-088109

[51] Int. Cl.⁶ .................................................. G06F 19/00
[52] U.S. Cl. ................................................. 364/420
[58] Field of Search ............................... 364/420, 423, 364/443

[56] References Cited

U.S. PATENT DOCUMENTS

| | | | |
|---|---|---|---|
| 4,283,763 | 8/1981 | Bylinsky et al. | 364/449 |
| 4,873,513 | 10/1989 | Soults et al. | 340/723 |
| 4,899,293 | 2/1990 | Dawson et al. | 364/521 |
| 4,972,319 | 11/1990 | Delorme | 364/419 |

FOREIGN PATENT DOCUMENTS

| | | |
|---|---|---|
| 0242050 | 10/1987 | European Pat. Off. . |
| 63-14097 | 1/1988 | Japan . |
| 03010279 | 3/1991 | Japan . |

OTHER PUBLICATIONS

*Journal of the British Astronomical Association*, "Mapping Mars from Mariner Pictures", C. A. Cross, Apr. 1972, UK vol. 82, N.R.

*Primary Examiner*—Donald E. McElheny, Jr.
*Attorney, Agent, or Firm*—Antonelli, Terry, Stout & Kraus

[57] ABSTRACT

In a digital cartographic system for processing geographic information, a map projection of a map is converted. The map projection transformation is carried out with a coordinate value in which longitude and latitude are set to a center by way of a linear interpolation so as to simplify a calculation required for transforming the map projection, and also not depending upon a map projection to be converted. Also, after the transformation process operation, a reference line such as longitude/latitude and an equiangular line is superposition-displayed/overlapping-displayed in order to assist an analysis, in response to a demand. In accordance with the present invention, a map can be shown with correctness of a distance and correctness of azimuth by performing various sorts of map-projection transformation, the digital cartographic system can support an intuitive idea of a user, and also can improve an information representation function of this digital cartographic system.

10 Claims, 15 Drawing Sheets

| VERTEX | LONGITUDE/LATITUDE | COORDINATE VALUES IN TRANSFORMATION MAP PROJECTION B |
|---|---|---|
| P1 | $\lambda 1, \phi 1$ | $X1, Y1$ |
| P2 | $\lambda 2, \phi 2$ | $X2, Y2$ |
| P3 | $\lambda 3, \phi 3$ | $X3, Y3$ |
| P4 | $\lambda 4, \phi 4$ | $X4, Y4$ |

FIG. 16

| PATH MANAGEMENT TABLE | | 1601 |
|---|---|---|
| NUMBER OF VERTEXT ON PATH N | | |
| COORDINATE VALUES OF VERTEX | DISTANCE BETWEEN VERTEXES | |
| $(\lambda 1, \phi 1)$ | $d1$ | |
| $(\lambda 2, \phi 2)$ | $d2$ | |
|  |  | |
| $(\lambda N-1, \phi N-1)$ | $dN-1$ | |
| $(\lambda N, \phi N)$ | — — | |

- 1602: NUMBER OF VERTEXT ON PATH N
- 1603: COORDINATE VALUES OF VERTEX
- 1604: DISTANCE BETWEEN VERTEXES

DIGITAL CARTOGRAPHIC SYSTEM FOR GEOGRAPHICAL INFORMATION PROCESSING

This application is a continuation of application Ser. No. 07/870,940, filed on Apr. 20, 1992, now abandoned.

BACKGROUND OF THE INVENTION

The present invention generally relates to a method for displaying graphic data by a designated map projection in a digital cartographic system for geographical information processing. More specifically, the present invention is directed to both of a system and a method for varying the displaying map projection by transforming a coordinate value of the graphic data into a desirable map projection.

A method for representing shapes, and ups and downs of a ground surface of the earth is so-called as a map projection (map projection transformations). As the necessary conditions of the map projection, there are such elements: ① an actual distance being analogously represented on a map (equidistance); ② an actual area being analogously displayed on a map (equivalence); and ③ an angle at a ground surface being correctly expressed on a map (equiangularity). Since a map drawn on paper is such a fact that a sphere is projected onto a plane, all of the above-described conditions cannot be simultaneously satisfied. To satisfy any of these conditions, a map is represented by a proper map projection, depending upon its usage.

The various sorts of map projections are described in detail in, for instance, Japanese publication entitled "Edition and Projection for Map" written by K. Kosaka, published by SANKAIDO publisher in 1982. In this publication, the calculations for projecting the coordinate systems expressed by longitude and latitude on a spherical surface onto the coordinate systems on a plane, are classified in accordance with shapes of projection surfaces and conditions of projection. There are employed a plane, a cylinder and a conic as the projection planes, whereas the above-described three conditions are handled as the projection conditions.

Conventionally, the coordinate transformation in case that map data are processed in the computer, is handled in view of inputting of a map and calculations of a distance and an area. When a map is inputted, it is necessary to convert a coordinate value of map data which has been written on paper by way of a different map projection, into a common coordinate system in order to totally manage the data. To manage the map data under better matching conditions, it is preferable to employ an expression of a coordinate system based on the longitude and latitude. If the longitude and latitude are utilized, the map data can be continuously managed over an entire region of the earth. In transactions of Japanese System Control Information Institute, "A Geographic Information System REALS for Personal Computer", volume 34, No 5, pages 138–146, 1990 by Taniguchi et al., and "Summary of Country Numeral Information" issued by Japanese Construction Ministry, Geographic map department, map supervision division in 1985, data management based on the longitude and latitude has been performed, In the former publication, there is described such a method for transforming the graphic data into the coordinate system by the longitude and latitude, which have been inputted by the Universal Transverse Mercator coordinate system (UTM coordinate system) employed in a map with a reduction ratio of 1/25000. Since the UTM map projection corresponds to an equiangular projection method, and furthermore a distance can be measured under practically acceptable precision in the map with the medium reduction ratio, there are merits that both the angles and distances can be directly calculated from the coordinate value. As a consequence, the UTM coordinate system has been employed to calculate the distances and areas in the latter publication, and also there is described such a method for transforming the longitude/latitude of the map data into the UTM coordinate system so as to perform this calculation.

Among others, there is another publication "Geographic Information System with Superior Analyzing Function: ARC/INFO" written by Imai, PIXEL, No. 54, pages 65 to 70, 1987 as a digital cartographic system handling a coordinate transformation. This system owns the coordinate transformation function as the edition function during the input/updating operations of the graphic data, and then can execute several different map-projection transformations with respect to the map data.

In case when map data are processed in computers, another map-projection transformation is required in view of output operations other than the above-described input operation. It is difficult to directly judge both azimuth and a distance from the map data which have been totally managed based on the longitude and latitude. While the digital cartographic system is utilized as an information representing means to analyze a region, a proper information representation suitable for a desirable analyzing purpose is required. To achieve an intuitively understandable analysis support, it is required to display map data with satisfying correctness in azimuth as well as correctness in a distance. There are the azimuth map projection and the UTM map projection, functioning as a method for representing either azimuth, or a distance. In accordance with the azimuth map projection used for a plane projection, azimuth at a center point of projection is equal to azimuth at a ground surface, and a line segment for connecting this center line and an arbitrary point, becomes a minimum path between two points. In accordance with the UTM map projection used for the cylindrical-plane projection, an angle between a ground surface and a corresponding map becomes equal, and also a distance on the map can be expressed as being substantially equal to an actual distance under practically acceptable map precision with a medium reduction ratio. However, it is only possible to express continuous coordinate system with having the interval of longitude within a range of 6 degrees in the UTM map projection. As to an area, it is possible to equally express the areas by way of the conical map projection and the cylindrical map projection.

To display map data in various sorts of map projections in conformity to objects, coordinate transforming operations should be carried out at a high speed and also at high precision. Further, when a coordinate system is converted into such a coordinate system as in the UTM coordinate system where discontinuities are present every 6 degrees, the discontinuity should be avoided by a proper way.

First, there is a problem in the coordinate transforming speed. Generally speaking, the coordinate transforming operation for the map data must be carried out with respect to a large quantity of graphic data. In the publication "Edition and Projection of Map", the projection formulae from the longitude and latitude to the coordinate systems of the various map projections are described. Since each of these projection formulae involves trigonometric functions and a logarithm, and therefore requires a large amount of calculating steps, there is a problem that a lengthy calculation time is necessarily required. In particular, since the projection formula to the UTM coordinate system is expressed by a series expanding formula, a back projection is not easily performed, but it is not suitable to calculate a large amount of calculation elements. It should be noted that although the coordinate calculating method with employment of the transforming table between the longitude/latitude and the UTM coordinate system has been described in the above-described publication "Edition and Projection of Map", since this transforming table has a high volume in unit of 1 minute and also the transforming formula is a biquadratic polynomial, a total amount of this calculation is not so reduced. In the publication "Summary of Country Numeral Information", in order to simplify the transformation from the longitude/latitude into the UTM coordinate system, the graphic data are subdivided into segments and one representative point is set in the segment, whereby the transforming formula is analogous to a local formula. Although the calculation of this method may be simplified, there is another problem that shifts happen to occur in the graphic data on the boundary line over the adjoining segments, resulting in an occurrence of discontinuities. Furthermore, the coordinate transformation effected in the ARC/INFO system is intended to perform the editing operation during the input/updating operations of the data, but to convert/display the map projections.

Subsequently, there is a problem in the discontinuities of the graphic data. The UTM map projection is effective to express an angle and a distance. To suppress distortion in the distance, the entire region is subdivided into narrow strips called zones at 6 degrees in this UTM coordinate system. Therefore, as represented in FIG. 8, there are great shifts at a boundary line of the adjoining zones in accordance with the higher latitude, so that the map data are represented with having the discontinuities on this boundary line. To represent the graphic data extending these zones in a continuous form, there is another great problem that such a distortion becomes large in accordance with the higher latitude. It should be noted that the coordinate transformations as defined in the above-described publications "Summary of Country Numeral Information", and "A Geographic Information System REALS for Personal Computer", and intended to effectively manage the data and also correct the analyzing amount, but not to represent various information to users. As a consequence, these coordinate transformation methods still contain the above-described discontinuities in the graphic representations.

In addition thereto, it is necessary to readily produce reference lines such as longitude, latitude and a curve of equal bearing during representation, which own such a function to assist the analysis. Features of the represented map data may be easily grasped by superimposing these reference lines thereon.

SUMMARY OF THE INVENTION

An object of the present invention is to provide a digital cartographic system for solving the above-described problems such as the continuity of the graphic representation and the simplification of the coordinate transformation calculations, and also a method for transforming the coordinate system and for displaying the converted coordinate system, and furthermore, to a method for displaying a reference line having a function to assist an analysis.

To simplify calculations for transforming a coordinate system irrelevant to a map projection to be converted, a transformation table is employed which corresponds to a means for transforming the corresponding coordinate values, and thus the coordinate transformation is carried out by the linear interpolation with reference to this transformation table in the present invention. In the transformation table, coordinate valves in the various sorts of map projections are related to the (equivalent) longitude and latitude and then the transformation is carried out via the longitude and latitude. As a result, it is possible to execute the coordinate transformation among arbitrary map projections contained in the table group.

Concretely, first, the map data is represented by the coordinate system based upon the longitude and latitude in order to maintain matching characteristics, and the map data is managed in unit of a sufficiently small section in order that the coordinate transformation by way of the linear interpolation can be achieved. As the segment, a region surrounded by longitude and latitude separated at a constant interval is utilized. In addition thereto, both longitude/latitude of 4 vertexes in a segment in unit of respective segments, and also the coordinate values at each of the corresponding map projections are combined as a table shown in FIG. 2. If the relationship between the longitude/latitude and the coordinate values at four vertexes in unit of subdivision management can be found out, then a coordinate value at an arbitrary point within a segment unit can be calculated from a proportional distribution between the vertexes. Also, the reference lines such as the longitude, the latitude and the curve of equal bearing, which can assist an analysis, can be calculated from the proportional distribution between the vertexes. The transformation is carried out with respect to the graphic data stored in the database. If the coordinate transformation is performed between one map projection A and the other map projection B, the graphic data stored in the database corresponding to the representation by the map projection A is referred, whereby the coordinate system of the longitude/latitude thereof is converted into the coordinate system for the map projection B. It can be prevented deterioration in positional precision caused by repeatedly perform the coordinate transformation from the coordinate values of the longitude/latitude stored in the database. It should be noted that with respect to a coordinate system for such a map projection that coordinate values of the respective points are different from each other in response to designation, such as an azimuth map projection requiring a base point (namely, a center point of projection) and also a conical map projection depending upon a region designated by a user, since a transformation table corresponding to the longitude and latitude cannot be previously expressed by numeral values, a table forming routine to produce a table in response to the coordinate value of the base point is prepared, and then the transformation table is expressed by the numeral values every time the base point is given.

With regard to the UTM coordinate system, a corresponding table between longitude/latitude and UTM coordinates for a single zone is prepared. The UTM coordinate system is periodic. The same coordinate values are repeatedly utilized for each zone is shifted by 6 degrees along the longitudinal direction. Therefore, an overall region of earth can be expressed by way of a remainder calculation for the longitude. As shown in FIG. 9, when a region extending two adjoining zones is handled, the discontinuities is avoided by properly shifting the zone by 6 degrees.

Since the map pattern is represented in the converted mode in conformity to correctness in a distance and correctness in azimuth in accordance with an object by a user, an intuitive idea can be supported. Since the linear interpolation is utilized to convert the coordinate values of the map pattern, both of the longitude/latitude and the coordinate values of the respective map projections can be mutually and easily converted therebetween. The transformation operations are independently carried out in unit of section by utilizing the transformation table corresponding to the transforming means, so that the calculation processes can be performed in a parallel distribution mode. To execute the coordinate transformation by the linear interpolation for the vertex data of the section, the continuity of the graphic data among the adjoining sections can be maintained. Even when the linear approximation is carried out by subdividing the calculation unit into the small regions, the coordinate values can be calculated at high precision. Furthermore, the discontinuities occurring between the adjoining zones can be avoided by shifting the zone with respect to the UTM coordinate system corresponding to the localized coordinate system.

DESCRIPTION OF THE PREFERRED EMBODIMENTS

Figure 1:
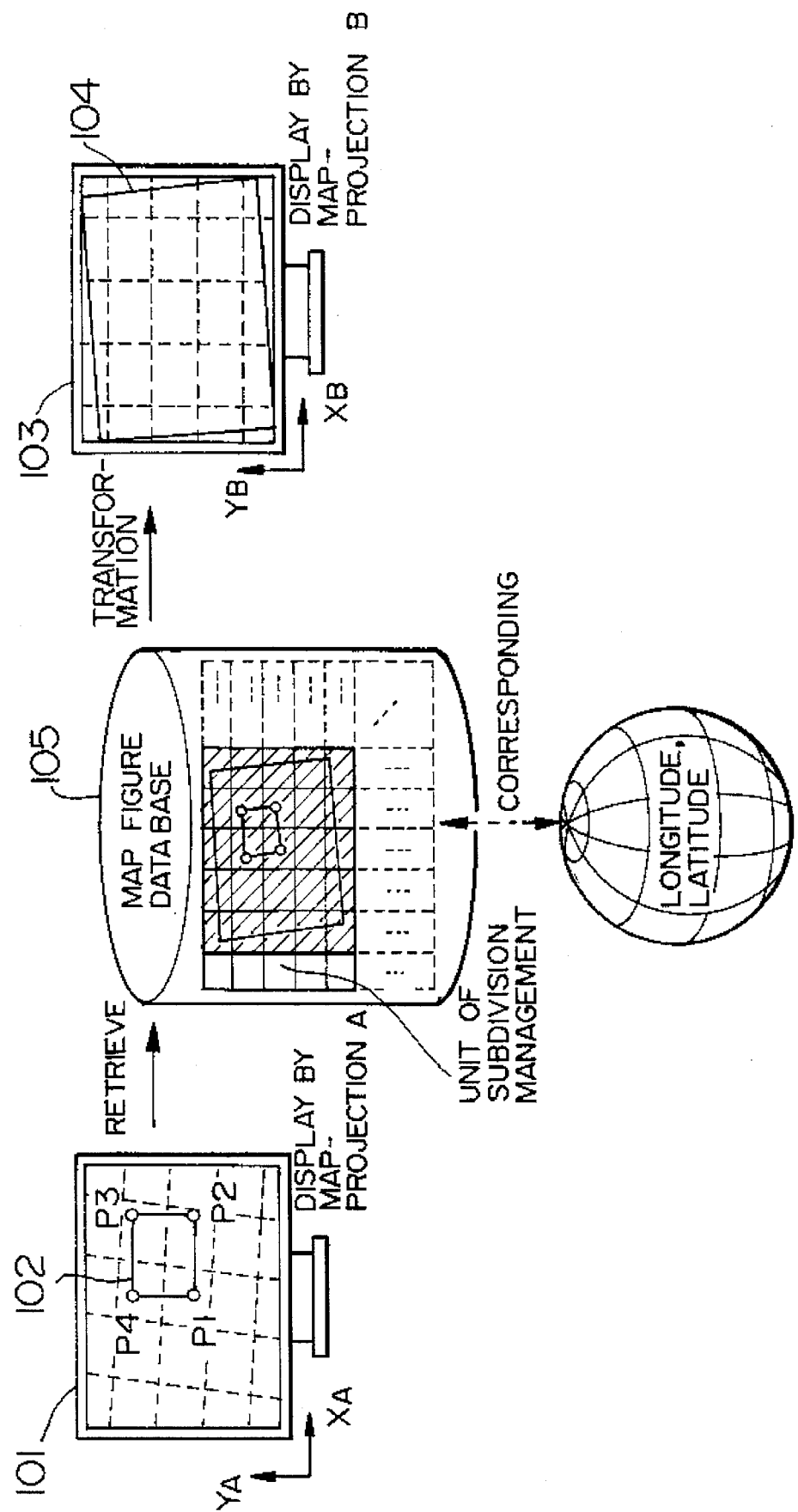
FIG. 1 schematically shows a processing operation of a map projection transformation according to the present invention.

Referring now to FIG. 1, one preferred embodiment according to the present invention will be summarized.

In FIG. 1, map data has been subdivided and managed in accordance with a coordinate system based upon longitude and latitude, and then stored into a map graphic database 105. It should be noted in this preferred embodiment that transformation/display processes are entirely performed via the longitude and latitude coordinate system. In other words, coordinate data inputted by a user are interpreted as longitude/latitude coordinate data, and coordinate transformations are executed with respect to the map figure data stored in the map figure database 105. As a result, it is possible to prevent accumulation of transformation errors of figure data which have been caused during the preceding coordinate transformations.

The transformation process is carried out by a linear interpolation manner, so that the transformation may be expressed by way of a matrix of 3×3 constants, and then a highspeed process operation by means of a hardware may be achieved. Since the transformations may be independently carried out every subdivision management unit to be subject, it is easy to execute a parallel distributed processing. It should be noted that the transformation display process is performed as follows. ① The transformation conditions are determined every subdivision management unit, whereby the transformations suitable for the sections are performed. ② Otherwise, the transformation condition is determined from a portion to which a user pays his specific attention (will be referred to "a region of interest"), so that the uniform transformation is performed over the entire region to be processed. In accordance with the flexible process ① since the transformation process is performed in such a manner that the coordinate transformation formula is set every section unit, the transformation may be executed in uniform precision over the entire region. In accordance with the uniform process, since the transformation formula is set from the region of interest and then the resultant transformation formulae are applied to the overall region, only one transformation-condition setting operation is required, whereby calculation process workloads for setting the transformation conditions may be reduced.

Both a map projection B to be converted and a region to be converted are entered by a user. When a base point of transformation is required in this map projection B to be converted such as an azimuth map projection, this base point is also inputted by the user. Both the region and the base point which have been entered by the user are stored in a table for managing the coordinate transformation. In FIG. 1, a region 1 indicates a transformation region (by a representation map projection A) designated by the user. In case that the uniform process is performed, a region of interest is furthermore designated. A region 102 surrounded by points $P_1$ to $P_4$ within the region 101 corresponds to the region of interest. Although the region of interest will be described later, both a coefficient of a coordinate transformation formula and precision in the transformation are determined from this region of interest.

Figure 2:
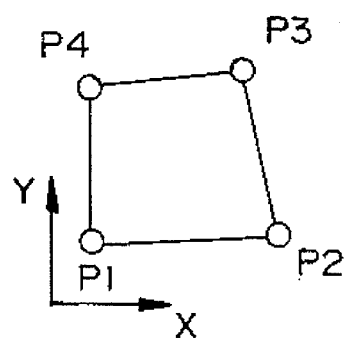
FIG. 2 schematically represents a relationship among coordinate values of vertexes in a region.

In accordance with the various conditions designated by the user, the map projection is converted by the system. In case that the region has been entered by the user in the coordinate system of the map projection A, both the coordinates of the vertexes of the region and the coordinate of the base point are back-converted from the map projection A into the longitude and latitude with employment of the transformation information utilized when the map is displayed under the map projection A. Subsequently, as represented in FIG. 2, the coordinate transformation formula is determined based upon the relationship between the longitude/latitude coordinate $(\lambda, \phi)$ of the vertex in the management unit and the coordinate $(X, Y)$ by the map pattern B thereof with respect to each of the subdivision management units contained in the region to be converted. Then, the graphic data on the region to be converted are converted and displayed, whereby a transformation result 103 is obtained, while sequentially retrieving the database 105. The setting and transforming process of the transformation conditions is carried out every single section in the unit of subdivision management. It should be noted that a region 104 within the display result 103 denotes a display range of the region 101 to be converted by the map projection B. Furthermore, after the transformation process has been completed, superposition display/overlapping display of a reference line is performed as an auxiliary operation of an analysis in response to a user's demand. It should be understood that a reference line denotes a line such as a longitude, a latitude, a grid line of an UTM coordinate system, and an isometric line around a certain point. Correctness in the azimuth of the display result, correctness in the distance, and graphic distortion when the uniform transformation is performed can be intuitively represented to users by displaying such a reference line in the superposition/ overlapping display mode.

Since the transformation processes are independently carried out in unit of section, these transformation processes can be executed in a parallel distribution manner. In case that a parallel computer having a hyper cube structure is employed, if each of the sections of the management units is allocated to each of the calculation processors, the overall process operation can be accomplished at a high speed. As a result, a large quantity of graphic data can be readily handled so that the problems can be easily solved.

In case of such an environment which cannot be processed in the parallel distribution processing mode, the process operations for reading and transforming the graphic data need be repeated by the times equal to the quantity of sections in the suitable transformation in the unit of management. To avoid such a cumbersome repetitive process, the uniform process is carried out based upon the region of interest. It should be noted that since the coordinate transformation is uniformly carried out over the entire region, the graphic data outside the region of interest does not always succeed to a nature of the map pattern B. To compensate for this problem, both the representation of the reference line and the evaluation of positional precision in the graphic data are performed in accordance with the user's demand after the presentation by the map projection B has been accomplished. The precision evaluation is performed by comparing with each other amounts of shifts among the uniformly converted data and the data converted every subdivision unit. The permissible range in the shift amounts (precision in transformation) depends upon worse precision in accordance with both of a size of a region and precision in graphic data which have been inputted by a user.

Figure 3:
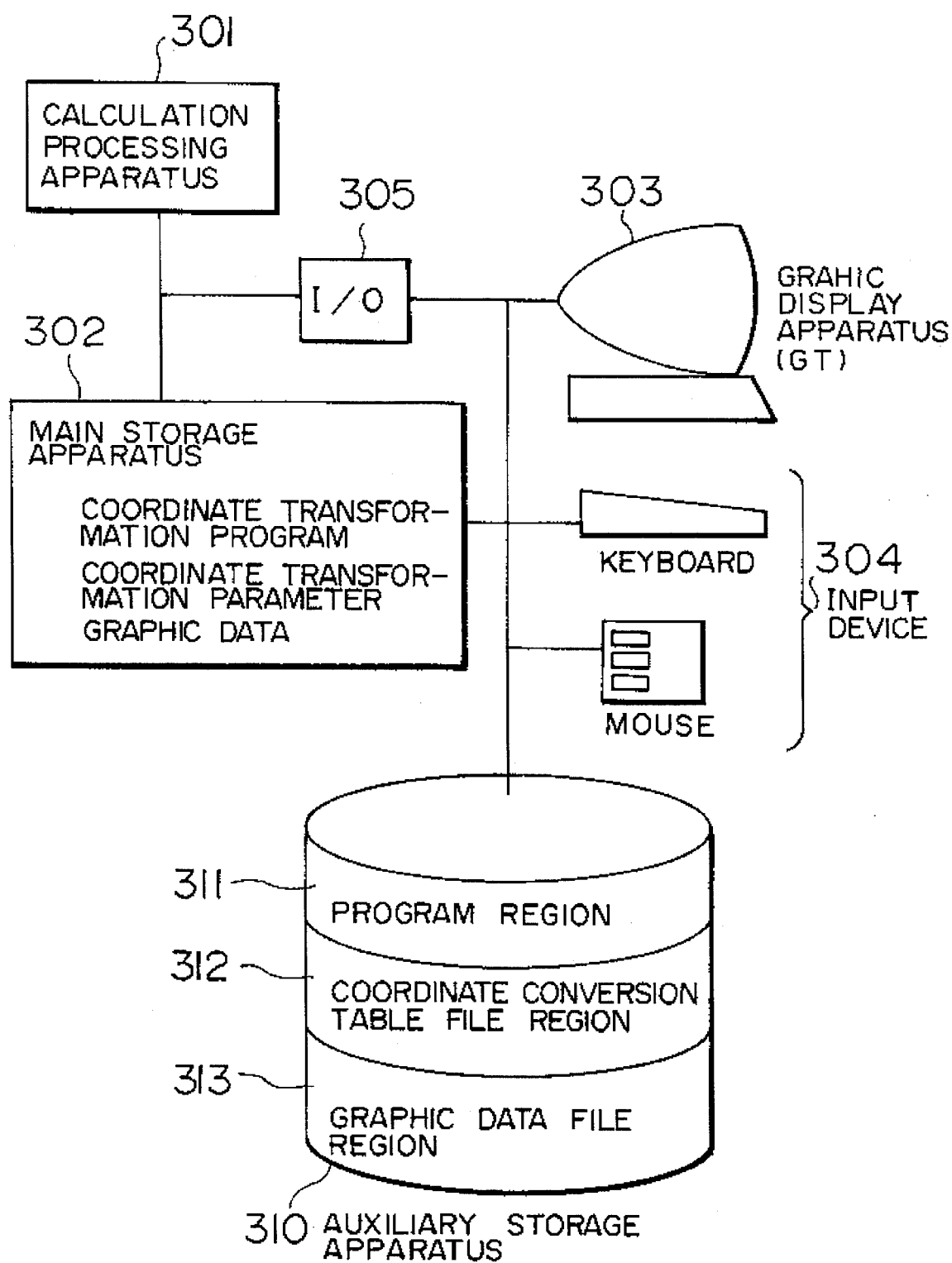
FIG. 3 is a schematic block diagram for representing an example of a construction of a computer system to embody the present invention.

In FIG. 3, there is shown a construction of a computer system for carrying and the above-described processing operations. A calculation processing apparatus 301 executes ① a coordinate transformation calculation, taking account of a transformation map projection and a map projection transformation region which have been entered via an input apparatus 304 corresponding to an input device such as a keyboard and a mouse; ② display data transfer to a graphic display apparatus (GT) 303; and also ③ controls of overall process operation. In a main storage apparatus 302, there are stored a program of coordinate transformation/display, data on a coordinate transformation table, and figure data. An auxiliary storage apparatus 310 includes a program region 311, a region 312 for a coordinate transformation table file, and a region 313 for a coordinate transformation table file, and a region 313 for a graphic data file. Each of storage contents is read out from them into the main storage apparatus 302, if required. Reference numeral 305 indicates an I/O interface circuit.

Figure 4:
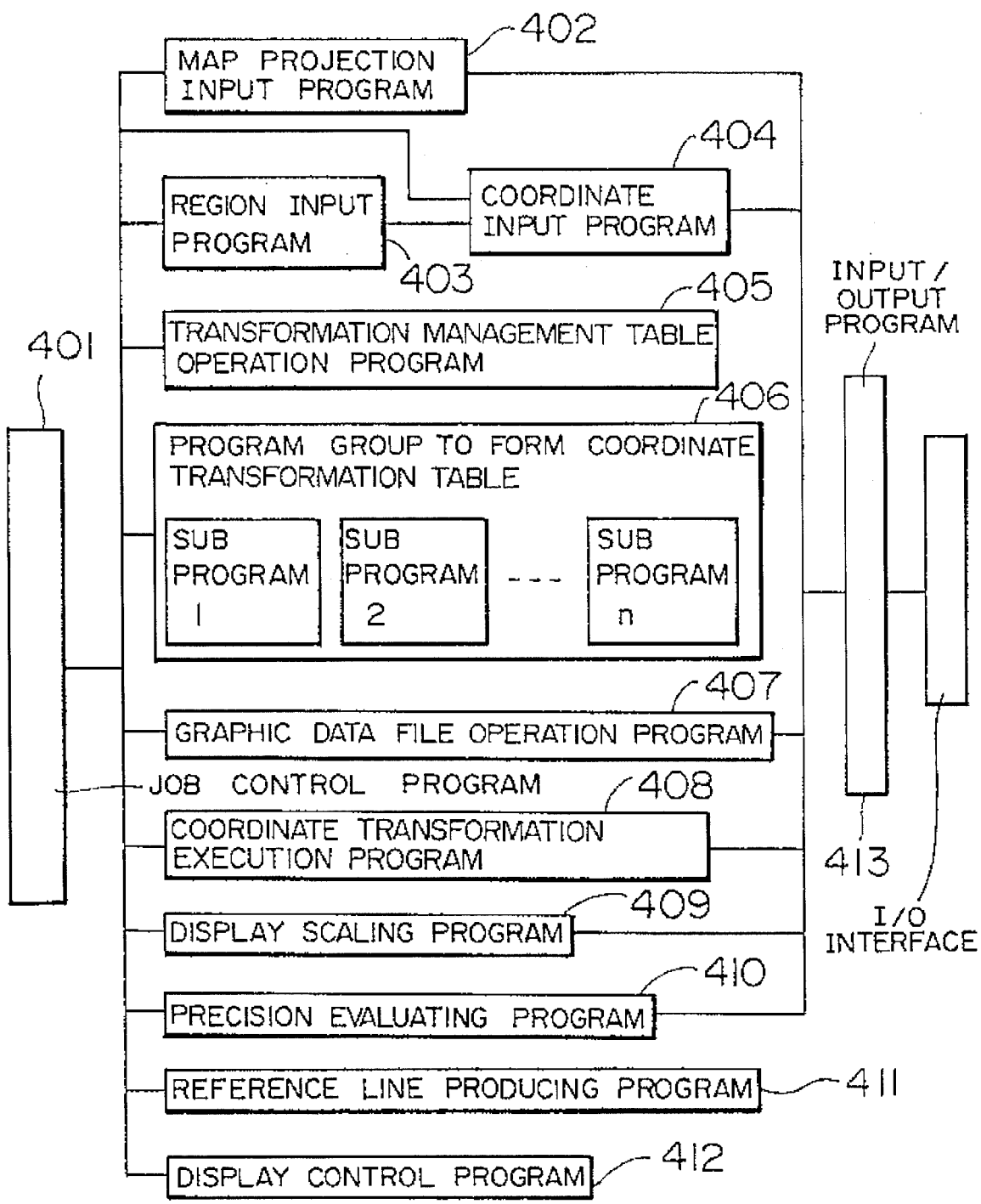
FIG. 4 schematically illustrates a construction of a program employed in the computer shown in FIG. 3.

In FIG. 4, there is shown a constructive example of the programs which have been prepared in the program storage region 311 within the auxiliary storage apparatus 310. Reference numeral 401 denotes a job control program to control executions of the respective process programs; reference numeral 402 indicates a map projection input program for causing a user to select the map projection B to be converted; reference numeral 403 represents a region input program for causing a user to designate a region to be converted; and also reference numeral 404 indicates a coordinate input program which is used to input a point and a base point when a region is designated. Furthermore, reference numeral 405 represents a program for operating a graphic transformation management table, by which a management table for region information entered by a user is operated. Reference numeral 406 is a program for forming a coordinate transformation table, which is used for such a map projection that the coordinate transformation table cannot be previously expressed by numeral data. As the map projection capable of not expressing the table as the numeral data, there are, for instance, an azimuth map projection requiring a base point, and also a conical map projection acceptable for a region designated by a user. This table production program 406 is arranged by subprograms used for the respective map projections. Reference number 407 indicates a graphic-data file operation program for operating a graphic data file; reference numeral 408 denotes a coordinate transformation execution program by way of the linear interpolation, reference numeral 409 represents a display scaling program for executing a scaling operation when transformation graphic data is displayed; reference numeral 410 is a precision evaluating program for transformation; reference numeral 411 indicates a reference line producing program used for superposition/overlay displaying the reference line; reference numeral 412 is a display control program for controlling reswitching of displays among the map projections A and B; and reference numeral 413 indicates an input/output program used to read/write the above-described programs from/into the input apparatus 304 and the auxiliary storage apparatus 310.

Figure 5:
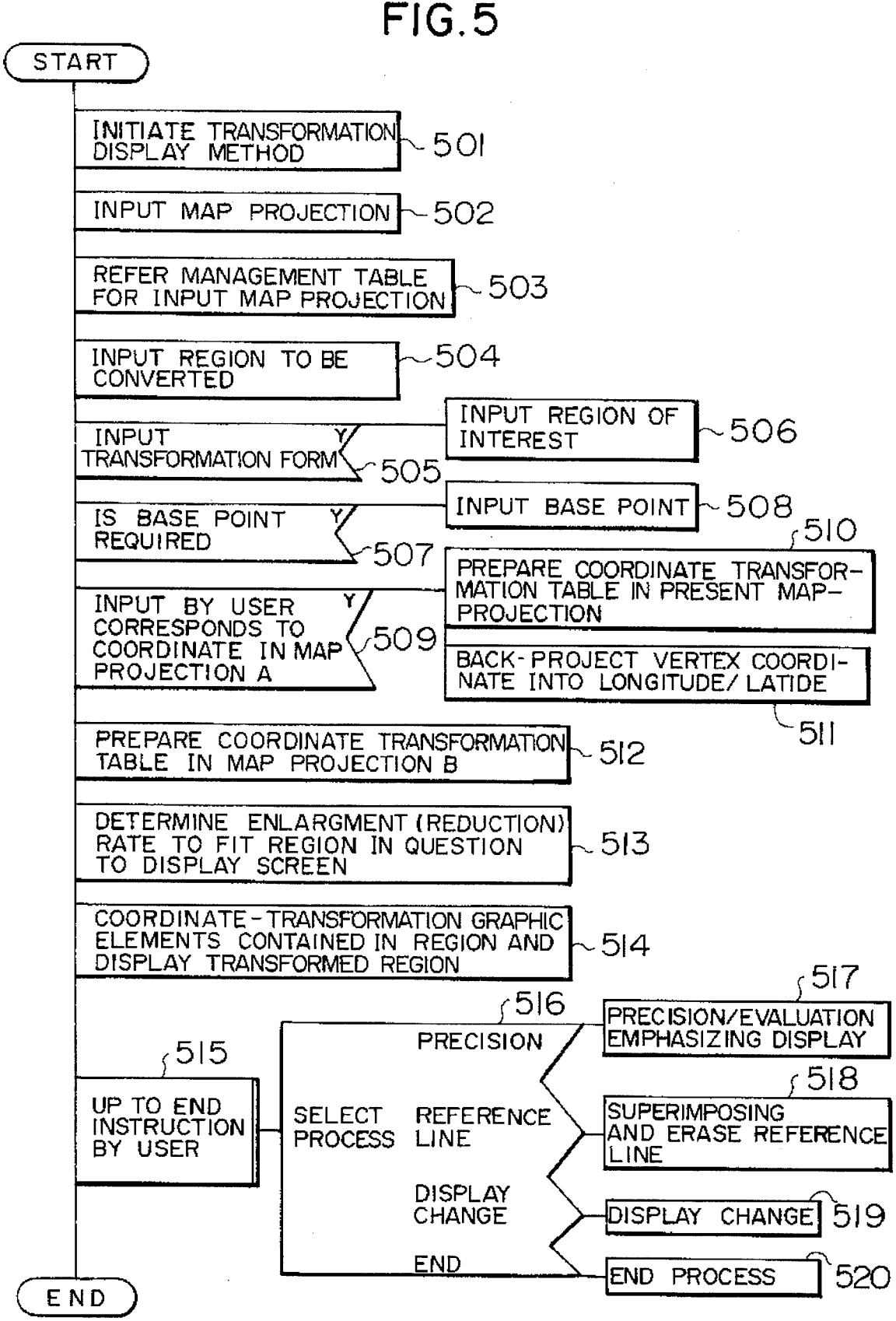
FIG. 5 is a flow chart for showing an overall process executed in the computer according to the present invention.

FIG. 5 is a flow chart (PAD diagram) for representing one example of an overall process executed in the computer. A process flow will now be described in accordance with this flow chart.

At a step 501, a amp display method according to the present invention is initiated by a user. As a result, the job control program 401 is read out from the program region 311 and then is written into the main storage apparatus 302 by the calculation apparatus 301. Since the process operations are similar when the respective programs are initiated, the explanations thereof are omitted. Upon initiation of the job control program 401, the present display map projection and the data on the display range are read out from the system table into which they have been previously registered, and then prepared in the main storage apparatus 302. Also, the transformation management table operation program 405 is initiated, and the Present display map projection data which have been registered in the coordinate transformation management table. This display map projection data is compared with the previously prepared data. If the display map projection data is different from the previously prepared data, the display map projection data is rewritten and this data is newly registered as the present display map projection data.

At a step 502, the job control program initiates the map projection input program 402 so as to cause a user to input the map projection to be converted. As one example, there is such a method that the map projections to be converted are represented in a menu form and a user will select a proper map projection.

At a step 503, the map projection management table selected by the user is read. The transformation management table operating program 405 reads the map projection management table from the coordinate transformation table file region 312 and writes this management table into the main storage apparatus 302. This map projection management table is utilized to confirm whether or not the map projection to be converted requires the base point, and whether or not the coordinate transformation table must be formed, and also to refer to the transformation table.

To execute steps 504 to 511 (will be discussed later), the job control program 401 initiates the region input program 403 and the coordinate input program 404.

At the step 504, the region input program 403 causes a user to enter a region to be converted. This is done in such a way that a coordinate of a vertex may be entered while requesting the user to input the numeral data from the keyboard, or a region may be designated on the display screen by utilizing a mouse.

In response to an instruction issued by a user, coordinate data may be inputted in a form of a coordinate value and also values of longitude and latitude by the present display map projection.

At a step 505, the management program confirms whether the method for performing this transformation corresponds to the suitable process or the uniform process. In case of the uniform process, a region of interest similar to that of the step 504 is inputted by the user at a step 506.

At the step 507, in accordance with the map projection management table which has been read at the step 503, confirmation is made whether or not a base point should be inputted. If necessary, a point input operation similar to that of the step 504 is carried out by the user at a step 508.

With the above-described input operations, the map projection transformation has been prepared. To prepare this map projection transformation, the job control program initiates the coordinate transformation execution program 408.

Processing steps from 509 to 511 correspond to such a process that the coordinate values inputted by the user are equal to those used in the present display map projection A. First, a judgement is made at the step 509 whether the user's input operation is caused by the map projection A, or the longitude and latitude are directly designated by the user. In case of the user's input operation caused by the map projection A, the process defined at the step 510 is executed. At this step 510, the coordinate transformation table for the map projection A and the longitude/latitude is prepared. Next, at the step 511, the back transformation from the map pattern A to the longitude/latitude is carried out. With respect to the respective vertexes of the region to be converted and the region of interest which have been inputted by the user, a back-transformation formula is produced based upon the coordinate relationship among the subdivision management units containing the vertexes thereof, and then the map pattern A is converted into the longitude and latitude coordinate system. Also, the back-transformation from the longitude/latitude coordinate system to the map pattern A is executed under control of the coordinate transformation execution program 408.

At a step 512, a coordinate transformation management data table is formed which is used in the map pattern B to be converted. Although the contents of this data table will be described later, the tables indicative of the information on the base point and the coordinate relationship as shown in FIG. 2 are prepared for the region to be converted and the region of interest.

In such a case that the coordinate transformation table has not yet been expressed as the numeral values by way of the map projection to be converted such as the azimuth map projection and the conical map projection, a subprogram corresponding to the sub-programs included in the coordinate transformation table forming program 406 is first initiated. A coordinate system in the map projection B is calculated under control of the program 406 based upon the longitude/latitude coordinate values with respect to the respective vertexes of the region to be converted and the region of interest.

When the coordinate transformation table has been prepared, one vertex of each of these region to be converted and region of interest is picked up. It is assumed that this picked up vertex is called as a vertex "a". From the longitude/latitude coordinate system of this vertex "a" the management unit containing the vertex "a" on the graphic data file region 313 is determined. Subsequently, the transformation data about the respective vertexes of this management unit are read out, and then a corresponding table between the longitude/latitude and the coordinate system of the map projection B is produced. The coordinate values at the vertex "a" by the map projection B are linear-interpolated under control of the coordinate transformation execution program 408, and the linear-interpolated coordinate values are registered together with the longitude/latitude coordinate values thereof into the coordinate transformation management table. The above-described process operation will be executed with regard to all of the vertexes of the region to be converted and of the region of interest.

At a step 513, an enlargement ratio (reduction ratio) for display purposes is determined. The enlargement ratio (reduction ratio) is determined in such a manner that the transforming region converted into the map projection B can be stored within the display area of the screen.

First, a circumscribed rectangle is obtained with respect to the transforming region expressed by the coordinate system on the map projection B, and thereafter the enlargement (reduction) ratio is determined in such a manner that the longer side of the rectangle can be stored within the display region. This ratio will be referred by the display scaling program 409.

Next, the map projection and representation with regard to the graphic data of the transforming region are carried out. The job control program 401 initiates the graphic data file operation program 407 and the display scaling program 409.

At a step 514, both of the transformation and representation for the graphic data are carried out. The graphic data about the subdivision management unit group containing the region to be converted are read out under control of the graphic data file operation program 407, and are converted under control of the coordinate transformation execution program 408, and thereafter are enlarged/reduced under control of the display scaling program 409, whereby the resultant graphic data are transferred to the display apparatus 303. In case that the transformation executing method has been performed every subdivision management unit, the process operation is carried out every unit of section. The graphic data in the unit of section is read out, the coordinate transforming formula is conducted from the relationship between the coordinate values at the vertexes of this section, and thereafter the coordinate system of the graphic data is converted. If the transformation executing method is performed based on the region of interest, the coordinate transforming formula is conducted from the relationship between the coordinate values at the vertexes of the region of interest, and then the subdivision units to be converted are uniformly converted.

A method for obtaining a subdivision management unit group in question from a region to be converted among a graphic data file will be described later.

The above-described operations are the major step of the map projection transformation. Thereafter, the job control program 401 executes both the precision evaluation and the superposition display/overlaying display of the reference line such as the longitude and the latitude in response to user's request. In this case, the precision evaluation program 410, the reference line generation program 411, and the display change control program 412 are initiated in response to the request.

A step 515 implies that the process operations from a step 516 to a step 520 are repeated until a user instructs an end of the process operation.

At a step 516, a judgement is made of an instruction made by the user, and the subsequent step is determined.

At a step 517, the positional precision on the graphic data which has been designated by the user via the region of interest, is evaluated under control of the display scaling program 409, and then the precision evaluated result is displayed on the display region under control of this program 409.

At a step 518, the reference line is superposition-displayed/overlapping-displayed. The longitude, latitude, and grid line of the UTM coordinate system are superposition-displayed/overlapping-displayed, and erased at intervals designated by the user.

At a step 519, the representations between the map projection A and the map projection B are rechanged. The transformation display executed in this embodiment is returned to the original map projection A, otherwise set to the map projection B. As a consequence, the display results of both of the map projections A and B may be compared with each other, and thus the analysis support may be performed more flexibly. The job control program 401 initiates the display control program 412 used for changing the representation, so that the back transformations from the map projection B to the longitude and latitude, and also from the longitude and latitude to the map projection A are executed in accordance with the contents of the coordinate transformation management data table. Otherwise, the back transformation from the map projection A to the map projection B is again executed. At this time, since all of parameters required for the transformations have been prepared, the display control program 412 merely controls the executions from the coordinate transformation table producing program 406 into the display scaling program 409. It should be noted that the coordinate transformation table producing program 406 executes changing operations of the coordinate transformation management data between the map projection A and the map projection B. When the transformation results are displayed on the separate windows, each of these transformation results is displayed on the separate windows, and these windows may be changed. More specifically, when both of these windows are positioned side by side in such a manner that these windows are not overlapped with each other as permeable as possible on the display screen, an easy window comparison can be achieved and an easy representation can be realized.

At a step 520, an end process is executed under control of the job control program 401. The display map projection data to be converted within the coordinate transformation management table is again registered to the present display map projection data by the transformation management table operation program 405, and thus the map projection data to be converted is erased. Thereafter, an end instruction for the step 516 is given.

Figure 6:
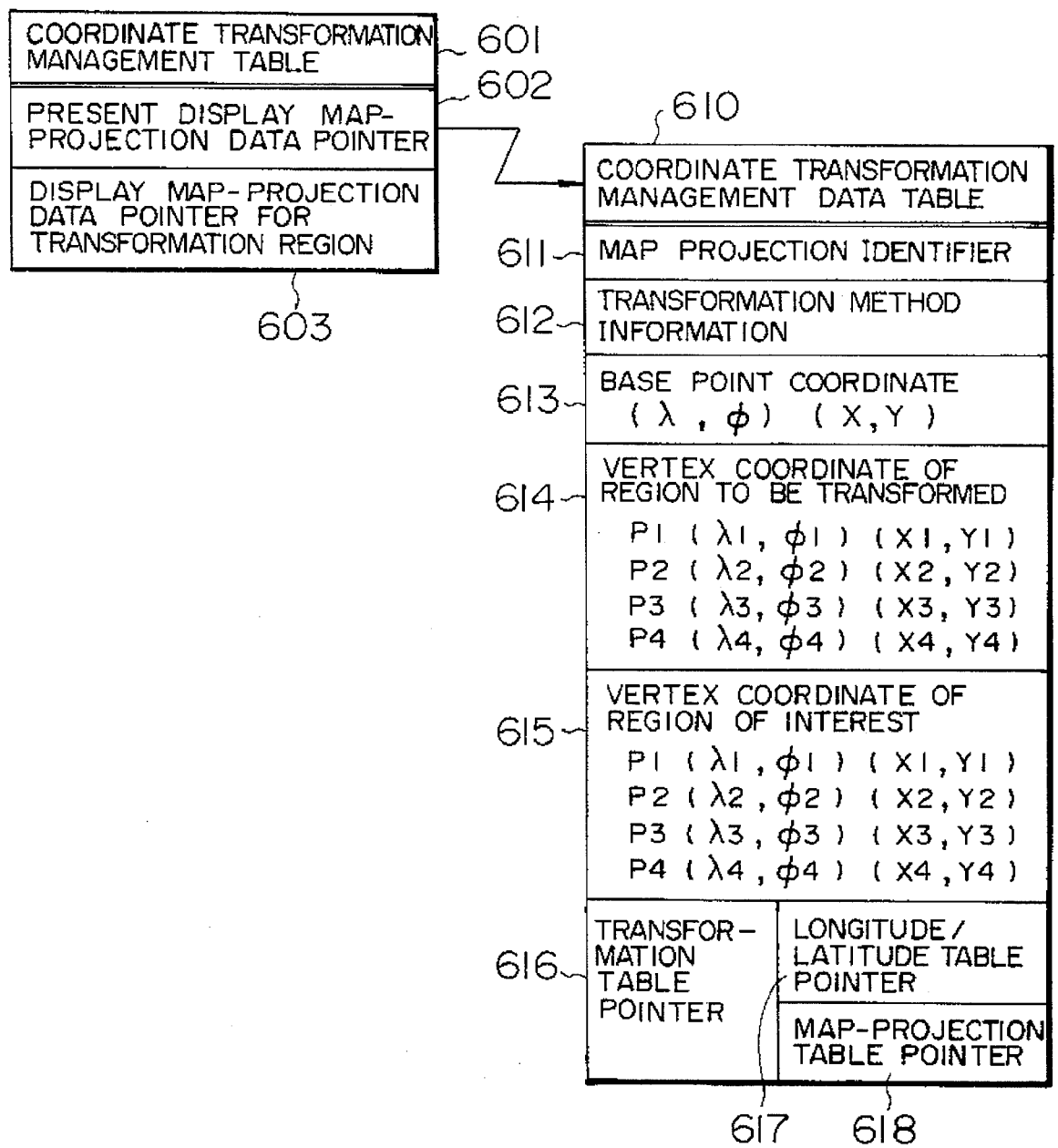
FIG. 6 schematically shows a coordinate-transformation management table.
Figure 7:
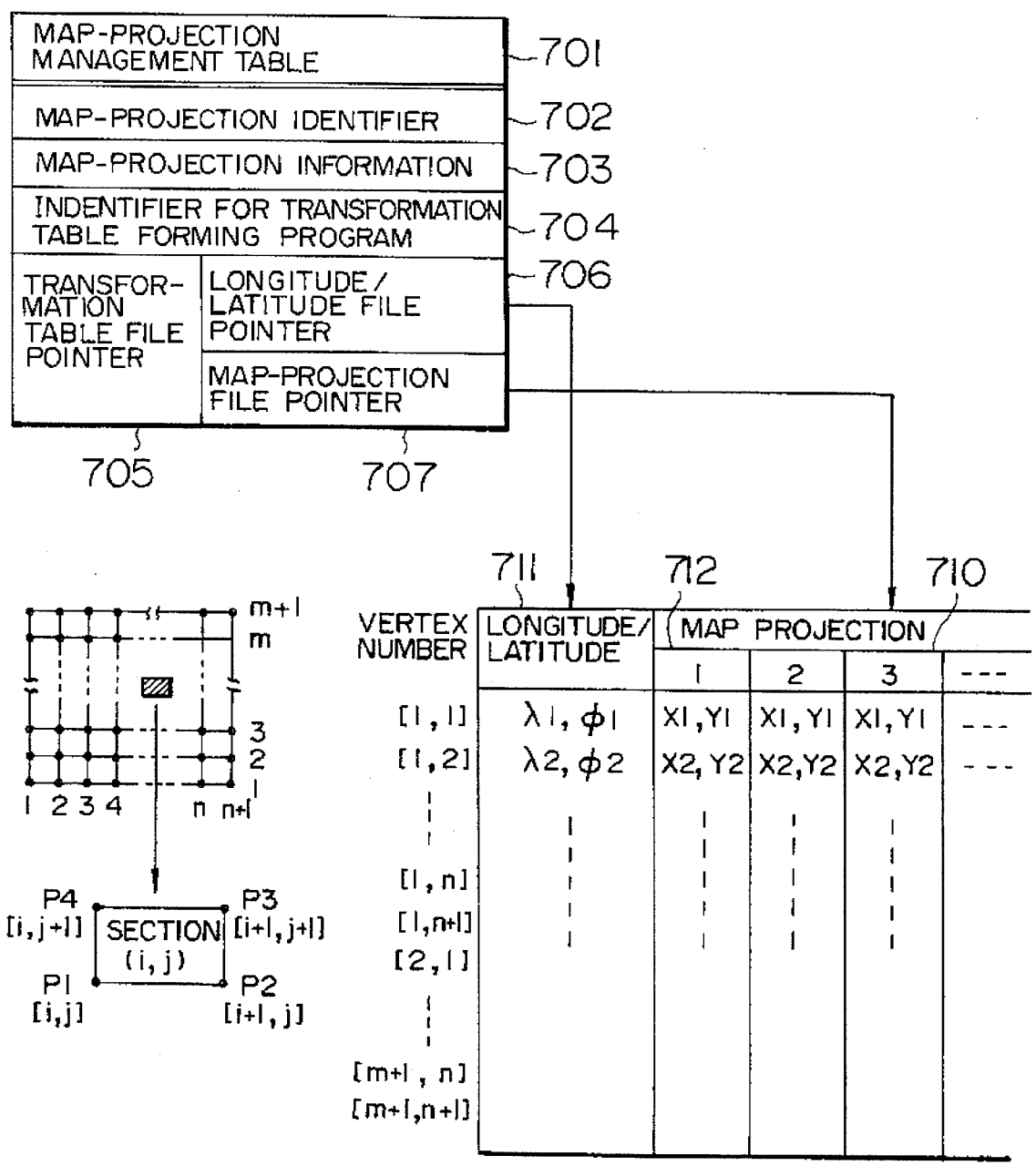
FIG. 7 schematically represents both of a map-projection management table and a coordinate transformation table.

Referring now to FIGS. 6 and 7, tables for managing information about the map projections and map projection transformations will be described. Both of the information about the map projections and the information about the coordinate transformation are independently prepared from the transformation process, so that the transformation process may be simply executed and the problems may be solved. FIG. 6 and 7 show contents of a coordinate transformation management table, a map projection management table and a coordinate transformation table.

FIG. 6 shows the coordinate transformation management table. A coordinate transformation management table 601 corresponds to a table used for establishing a relationship among the present display map projection, the longitude/latitude management data and the map projection to be converted as shown in FIG. 1. The coordinate transformation management table 601 is constructed of two data tables for combining the longitude/latitude data in the graphic data file region 313 with the projection data to be converted, and also of a pointer table for designating these data tables. First, the pointer table is arranged by a pointer 602 to the present display map projection data table, and also a pointer 603 to a display map projection data table to be converted. A coordinate transformation management data table 610 designated by the respective pointers, is constructed of an identifier 611 of a map projection; transformation method information 612 indicating a preparation state of a transformation table and also such a matter whether or not a region of interest is designated; a base point coordinate 613; a vertex coordinate table 614 for a transforming region; a vertex coordinate table 615 of a region of interest; and a pointer 616 for pointing out the coordinate transformation table. The transformation method information 612 indicates discrimination whether the transformation is performed based upon the respective management unit, or the uniform transformation is carried out based on the region of interest; discrimination whether or not there is a base point; and discrimination whether or not the coordinate transformation table has been prepared with respect to an overall region to be converted. The relationships between the longitude/latitude coordinate values of the vertexes of the region shown in FIG. 2, and the coordinate values by the map projection denoted by the identifier 611 have been registered in the vertex coordinate tables 614 and 615. When the contents of the coordinate transformation management table are rewritten at a step 520, merely the pointers are substituted. The transformation table pointer 616 is arranged by a pointer 617 used for the longitude/latitude coordinate table and a pointer 618 used for the coordinate table of the map projection indicated by the identifier 611, and is accepted from each of the map projection management tables 701.

In FIG. 7, there is shown a relationship between the map projection management table and the coordinate transformation table. A map projection management table 701 corresponds to such a table for managing information related to a map projection shown in a map projection identifier 702. This management table 701 is constructed of graphic information 703 related to such an information whether or not the transformation table has been expressed by numeral values, and also whether or not the base point is required; an identifier 704 of a transformation table forming program;

and a pointer 705 for pointing out a transformation table within the coordinate transformation table file region 312. The graphic information 703 consists of a NUMERAL-LABEL and a BASE-POINT-LABEL. The NUMERAL-LABEL represents whether a transformation table is already expressed as the numeral values or not. The BASE-POINT-LABEL represents whether a map projection requires a base point or not. For instance, as to the azimuth map projection, the NUMERAL-LABEL is set to "YET". (The NUMERAL-LABEL requires to make the table expressed as the numeral values.) The BASE-POINT-LABEL is set to "NEED". (The azimuth map projection requires a base point.) On the other hand, as to the conical map projection, the NUMERAL-LABEL is set to "YET" and the BASE-POINT-LABEL is not set to "NO-NEED". (The conical map projection does not require a base point." If the transformation table is not expressed as the numeral values, the transformation table file pointer 705 is not stored, but the program identifier 704 has been set instead of this pointer. At a step 513, the program corresponding to the program identifier 704 in the coordinate transformation table forming program 406 is initiated. If the transformation table has been expressed as the numeral values, the program identifier 704 is set to "0", and then a pointer for designating a file is stored into the transformation table file pointer 705. This transformation table file point 705 is arranged by a pointer 706 for the longitude/latitude coordinate file and also a pointer 707 for a coordinate file of a map projection indicated by the identifier 704.

A transformation table file group 710 is stored into the coordinate transformation table file region 312 in accordance with the management unit of the graphic data which has been stored into the graphic data file region 313. The transformation table file group 710 is arranged by a longitude/latitude file 711 indicative of a longitude/latitude coordinate system corresponding to each of vertexes in the respective management units, and a coordinate value data file 712 provided for each map projection corresponding to the same vertex in conformity to the minimum subdivision management unit of the graphic data. In case that the transformation table is not previously expressed in a numeral value, these tables 711 and 712 of the subdivision management unit group corresponding to the region to be converted are produced with employment of the coordinate transformation table forming program 406. The produced tables are registered at table pointers 617 and 618. The coordinate relationship among the vertexes in the subdivision management unit, can be easily conducted from the relationships 720 among the sections and vertex data, if the subdivision management unit is determined. This process operation is carried out under control of the transformation management table operation program 405.

Figure 8:
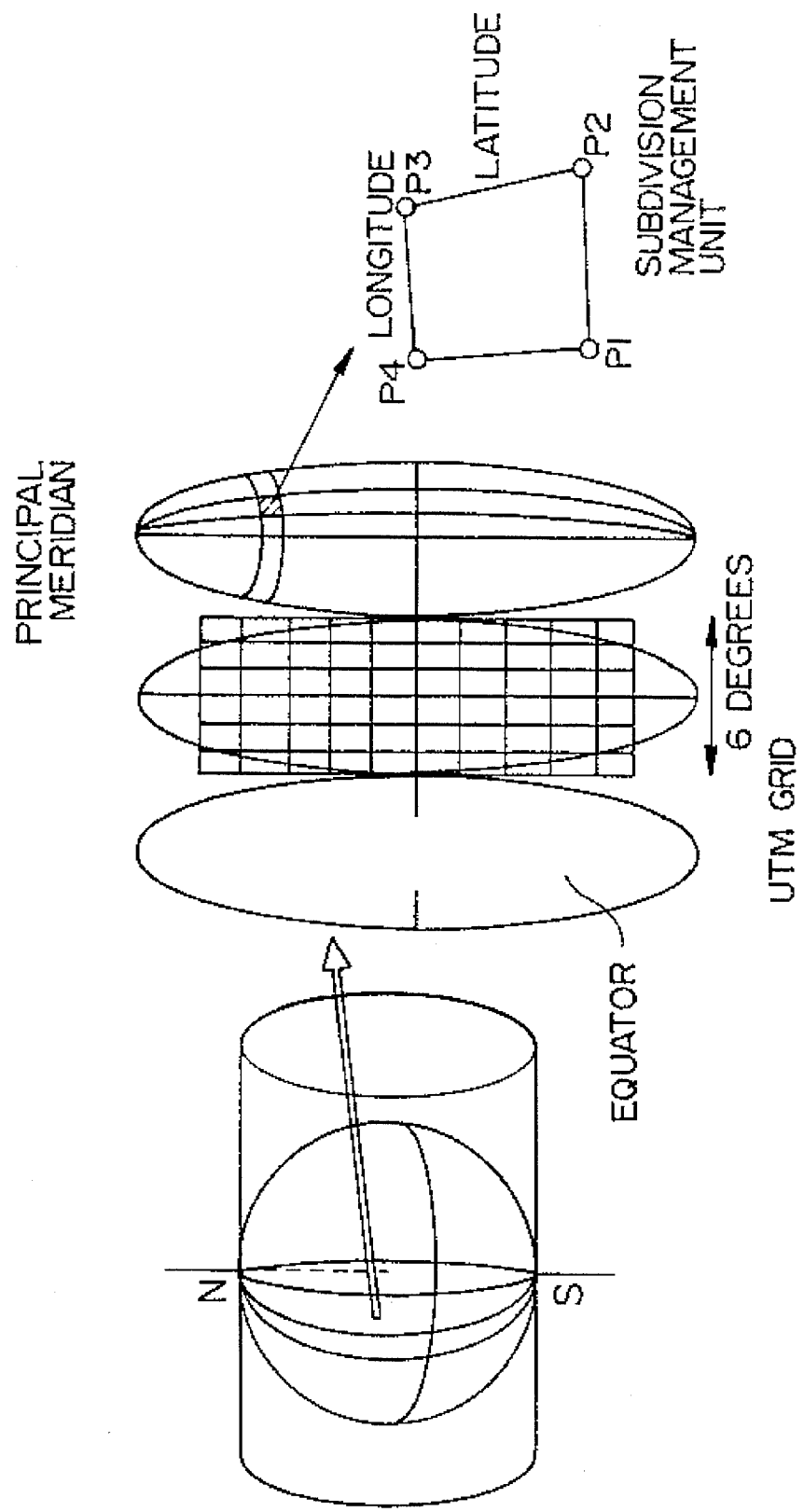
FIG. 8 is a schematic diagram for showing an UTM coordinate system.
Figure 9:
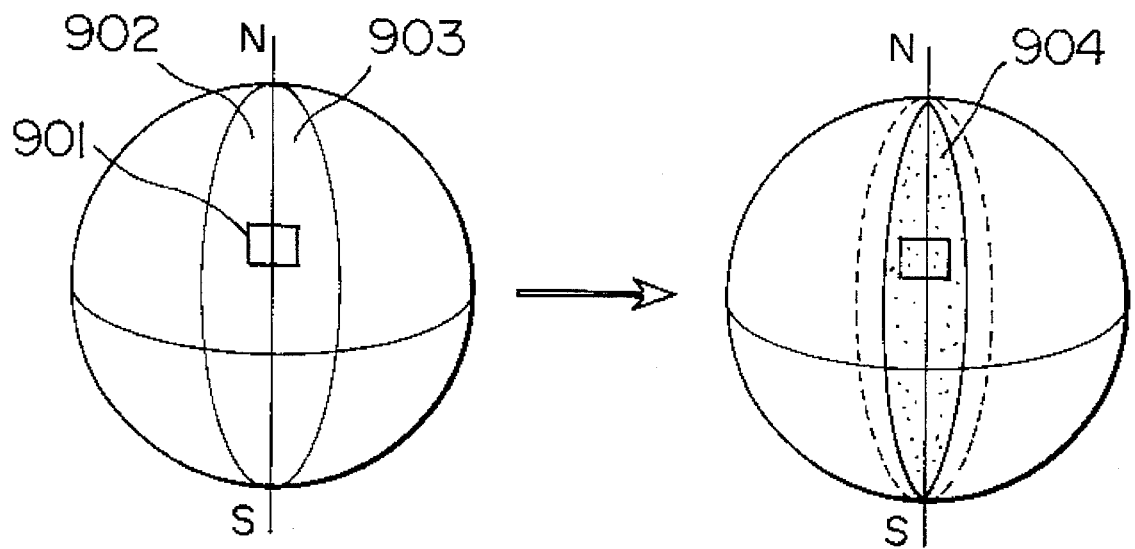
FIG. 9 schematically indicates a method for preventing discontinuities of the UTM coordinate system.

FIGS. 8 and 9 are explanatory diagrams in case of the UTM coordinate system.

FIG. 8 is an explanatory diagram of a coordinate transformation table in the UTM coordinate system. As a shown in this figure, to suppress distortions in distances during projections, the UTM coordinate system is segmented into zones every 6 degrees in a longitudinal direction, and thus an overall surface of the earth is represented by 60 zones. Since the UTM coordinate system corresponds to such a coordinate system every zone, the same coordinate values are obtained every time the zone is shifted by 6 degrees along the longitudinal direction. As a consequence, it is not required to prepare transformation tables over the entire file of the graphic data file region, and then a transformation table between longitude/latitude and the UTM coordinate system with respect to a single zone may be prepared. The UTM coordinate system can be related to the residue calculation of the longitude. Furthermore, if an attention is given to symmetry, only a transformation table with respect to a portion of a zone corresponding to ¼ upper portion thereof is prepared. The format of the transformation table is followed to the files 711 and 712, whereas the relationship between the subdivision unit and the vertex is followed to the relationship 720. The process operations including the remainder calculation of the longitude are carried out under control of the transformation management table operation program 405.

FIG. 9 indicates a method for preventing a discontinuity of the UTM coordinate system. A description will now be made of such a process executed in that a region 901 to be converted extends over two zones 902 and 903. By performing this process, the overall surface of the earth is segmented again into another UTM zones by shifting zones properly. New zones can be set including an old boundary and the region 901 in one zone. Therefore the region 901 has no boundary in a new zone, so that the problems can be also solved. If an extension of the region 901 along the longitudinal direction is within 6 degrees, a zone such as the zone 904 is properly shifted, the discontinuity in representation can be avoided. An amount of shifting angle in the longitudinal direction is determined based upon a central value of the longitude of the region to be converted. A similar process operation can be achieved by shifting it by this shift amount while performing the residue calculation of the longitude with reference to the corresponding table.

Next, a coordinate transformation process operation by way of the linear interpolation will now be explained. In accordance with the coordinate relationship shown in FIG. 2 a coordinate value $(X_i, Y_i)$ in the designated map projection corresponds to a longitude/latitude coordinate $(\lambda_i, \phi_i)$ of a vertex $(\lambda_i, \phi_i)$ (note that i=1 to 4). When the region to be converted is surrounded by a longitude and a latitude, since $\lambda 3=\lambda 2$; $\lambda 4=\lambda 1$, $\phi 2=\phi 1$ and $\phi 3=\phi 4$, $(X, Y)$ corresponding to a point $(\lambda, \phi)$ will be calculated from both proportional distributions about the respective "$\lambda$" and proportional distributions about the respective "$\phi$" as follows:

$$X=[(\phi 2-\phi)\{(\lambda-\lambda 1)X2+ (\lambda 2-\lambda)X1\}+(\phi-\phi 1)\{(\lambda-\lambda 1) X3+(\lambda 2-\lambda)X4\}]/\{(100\ 2-\phi 1)(\lambda 2-\lambda 1)\}$$

$$Y=[(\phi 2-\phi)\{(\lambda-\lambda 1)Y2+ (\lambda 2-\lambda)Y1\}+(\phi-\phi 1)\{(\lambda-\lambda 1) Y3+(\lambda 2-\lambda)Y4\}]/\{(100\ 2-\phi 1)(\lambda 2-\lambda 1))$$

In other words, it may be obtained by the linear transformation while the above-described formulae are expanded to acquire the below-mentioned formula $$[X, Y, 1]=[\lambda, \phi, \lambda.\phi].T$$

T: 3×3 transformation matrix (constant matrix) Since the transformation matrix T is determined only from 4 vertexes of the segment and also the transformation formula is expressed by the linear form, the coordinate transformation calculation may be simplified. Furthermore, since the coordinate value after the transformation are determined from the proportional distributions of the coordinate values of the respective vertexes, there is no shift in the graphic data on the boundary line of the adjoining segments and thus the problems can be solved. Since the subdivision management unit corresponds to the segment surrounded by the longitude and the latitude, the transformations can be executed every segment in the suitable process. To the contrary, in the uniform process, the above-described formula may be applied by that either the region of interest is inputted as the region surrounded by the longitude/latitude, or the region of interest is substituted by the longitude/latitude. As the substitution method, it is realized by selecting such a region which is inscribed with the region of interest and surrounded by the longitude/latitude.

Figure 10:
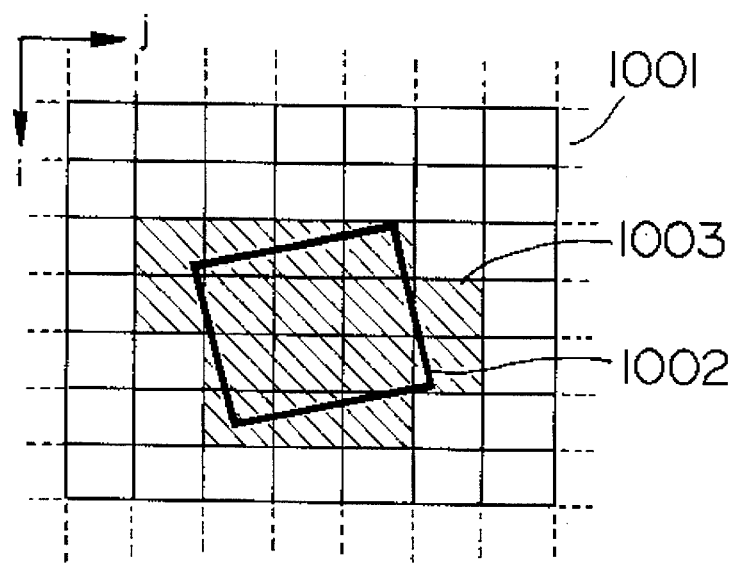
FIG. 10 schematically shows a relationship between a coordinate transforming region and a data file.

FIG. 10 represents a relationship between a region to be converted and a subdivision management unit. A description will now be made of a method for obtaining a subdivision management unit group corresponding to a region to be converted from a graphic data file. Reference numeral 1001 indicates a data file within the graphic data file region 313. With respect to the respective vertexes of the region to be converted, points corresponding thereto on the data file are obtained from the longitude/latitude coordinates of the vertexes. A region 1002 formed by connecting the corresponding points of the respective vertexes is assumed to as a region to be converted on the data file. A minimum set 1003 of a section or segment including this region 1002 corresponds to a management unit group which should be converted. There is one method for managing the minimum set 103 as a roster form list. The coordinate transformation processes are carried out with respect to the respective segments. Since the transformation processes are independently carried out in the unit of segment, these transformation processes may be performed in the parallel distributed mode. Further, when a transformation table is formed, a relation is obtained between the longitudes and latitudes at these vertexes of the segments, and the coordinate values under the designated map projection.

Subsequently, a method for generating a reference line according to a preferred embodiment of the present invention will now be described. This is done with respect to a display screen. The representation made on this display screen is a region to be converted which has been designated by a user. As a result, the process to generate the reference line is carried out with regard to a graphic data subdivision management group similar to a subject of the coordinate transformation process. Here, the kind of reference line is designated by the user, the positions of this reference line are calculated every subdivision management unit and displayed. Standard condition values are previously set to a display interval and a display color of the reference line. A confirmation is made during the setting operation whether or not a setting change is requested. If there is no specific input, the display of the reference line is carried out in accordance with the standard conditions. The reference line is generated in such a way that a cross point between a boundary line (longitude/latitude) of a segment and a reference line is calculated, and the calculated cross points are connected to each other. Since the management table of the reference line is independently provided from the map-projection transformation process and the transformation management table, the reference line can be produced irrelevant to the original display map projection and the transforming map projection. As a consequence, the reference line functioning as an assistance of analysis may be freely selected and therefore an analysis support may be flexibly achieved.

Figure 11:
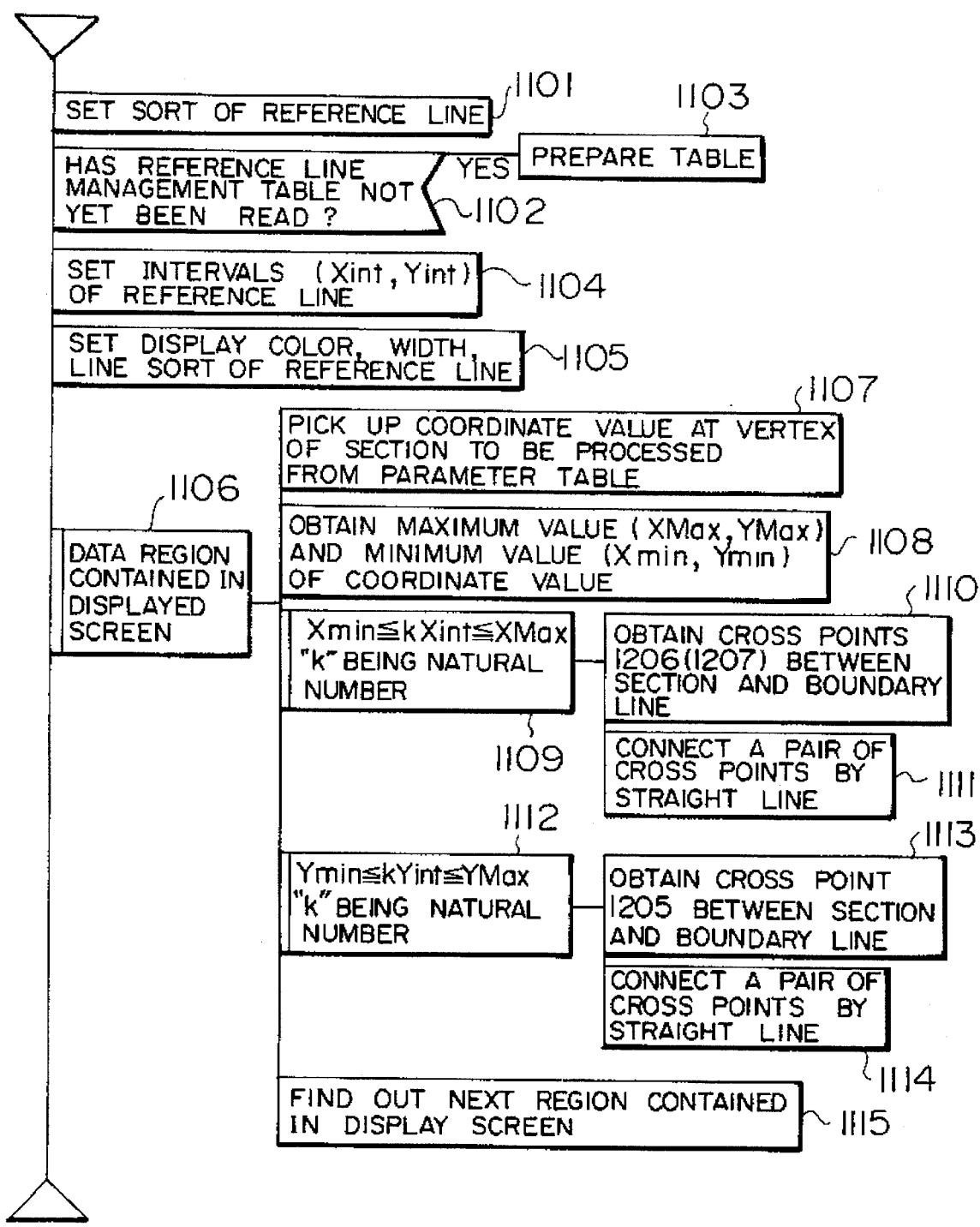
FIG. 11 is a flow chart (PAD diagram) for explaining a process to produce a reference line.

FIG. 11 is a flow chart for explaining the process to generate the reference line.

At a step 1101, a sort of reference line is set. As one example, there is such a method to select the sort of reference line by a user while the sorts of reference lines are displayed in a menu form.

At a step 1102, a check is done whether or not a management table of the reference line which has been set at the previous step 1101 is prepared. If the management table has not yet been prepared, a process defined at a step 1103 is executed to prepare such a management table. Under control of the support-management table operating program 405, the reference line management table is read out from the coordinate transformation table file region 312 and then is written into the major storage apparatus 302. Furthermore, under control of the support-management table operating program 405, a map projection identifier of the coordinate transformation management table is referred. If either this map projection identifier of the coordinate transformation management table is different from another map projection identifier of the reference line management table, or there is no coordinate transformation table for an overall region to be converted, a table is produced in accordance with the coordinate transformation table producing program 406. A map-projection management table indicated by the map projection identifier will be referred, if required. Also when no base point has been entered in case that the base point is required such as in the equi-angularity, the base point is inputted in accordance with the coordinate input program 404. Upon formation of the table, the resultant table is registered in a transformation table pointer of the reference line management table. If there is the same map projection in the coordinate transformation management table, it is also registered into a table pointer thereof.

At a step 1104, an interval of the generation of the reference line is set. This interval is indicated as Xint, Yint and α as shown in FIG. 12. In case of the longitude/latitude, or the equiangularity, this interval is an angle such as every certain degree. In case of the grid line of the UTM coordinate system, this interval corresponds to a distance interval such as every certain kilometers.

At a step 1105, a display condition of the reference line is set. In this preferred embodiment, a display color, a width of the reference line, and a sort of reference line are set.

A step 1106 implies a present display range. That is to say, the process operations defined from the step 1107 to the step 1115 are repeatedly executed with respect to the respective subdivision management units of the region to be converted which has been designated by a user. Since these process operations can be separately executed with respect to each of the minimum sets 1003 of the segment, the parallel process operation may be performed similar to such a case of the coordinate transformation and thus the process operations can be carried out at a high speed.

At a step 1107, as shown in FIG. 2, coordinate values of the reference amount corresponding to the longitude and latitude are combined with each other with respect to the vertex of the subdivision unit to be processed at this time. This method is similar to such a method for producing a corresponding table between the longitude/latitude and the coordinate of the map projection B at the step 512 during the coordinate transformation. In case of the grid line in the UTM coordinate system, it may be combined with reference to a transformation table by way of the remainder calculation of the longitude and latitude.

At a step 1108, a minimum value and also a maximum value of a coordinate value for the reference amount are obtained from the corresponding table produced at the previous step 1107. In case of the equiangularity, the coordinate value of the table is converted into angular information around the base point 1208, and then a maximum (minimum) value thereof is obtained. A range of the reference amount to be processed is restricted by previously obtaining the maximum (minimum) value.

A step 1109 implies that process operations defined at a step 1110 and the step 811 are executed with respect to each of the reference amounts X (or α) contained in between the minimum value and the maximum value. At this time, the reference amount is expressed as a value obtained by multiplying the interval value by "K" (symbol "K" being natural numbers).

At a step 1110, a cross point between the reference line and each of the boundary lines (longitude/latitude) at the subdivision management unit is obtained. In case of the longitude and latitude, or the grid line of the UTM coordinate, a cross point between a straight line X=K·Xing and the boundary line is obtained. In case of the equiangularity, a cross point between the boundary line and a straight line having an angle "Kα" in a designated direction is obtained. At this time, a formula of the straight line is expressed is follows:

$$Y = \tan(k\alpha) \cdot (X - Xo) + Yo$$

At a step 1111, a line segment to connect the thus obtained cross points with each other is displayed. The line segment is enlarged/reduced under control of the display scaling program 309 and then is transferred to the display apparatus 203.

From a step 1112 to a step 1114, a process operation similar to that defined from the step 1109 to the step 1111 is carried out with respect to the reference amount Y.

At a step 1115, a subsequent subdivision management unit is obtained.

Figure 12A:
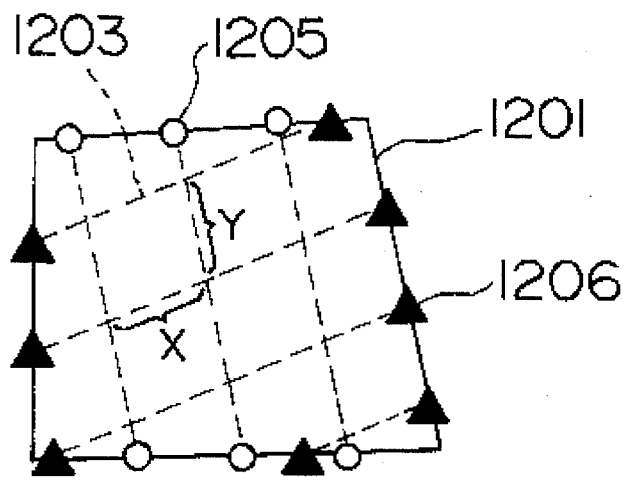
FIGS. 12A and 12B are schematic diagrams for showing the process for generating the reference line.
Figure 12B:
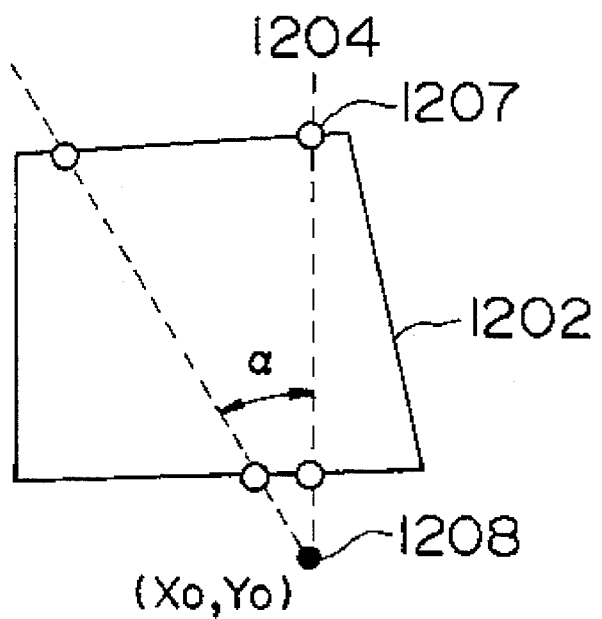

FIG. 12 schematically shows a process to generate a reference line, namely a relationship between the reference line and a subdivision management region. FIG. 12A represents such a case of longitude and latitude, and also a grid line of the UTM coordinate system, whereas FIG. 12B shows an equiangularity. Reference numerals 1201 and 1202 indicate boundary lines at the subdivision management unit, and become longitude and latitude. Dot lines 1203 and 1204 indicate reference lines indicative of k·Xint; reference numerals 1205, 1206 and 1207 denote cross points between the respective reference lines and the boundary lines; and reference numeral 1208 denote a base point of an equiangularity.

Figure 13:
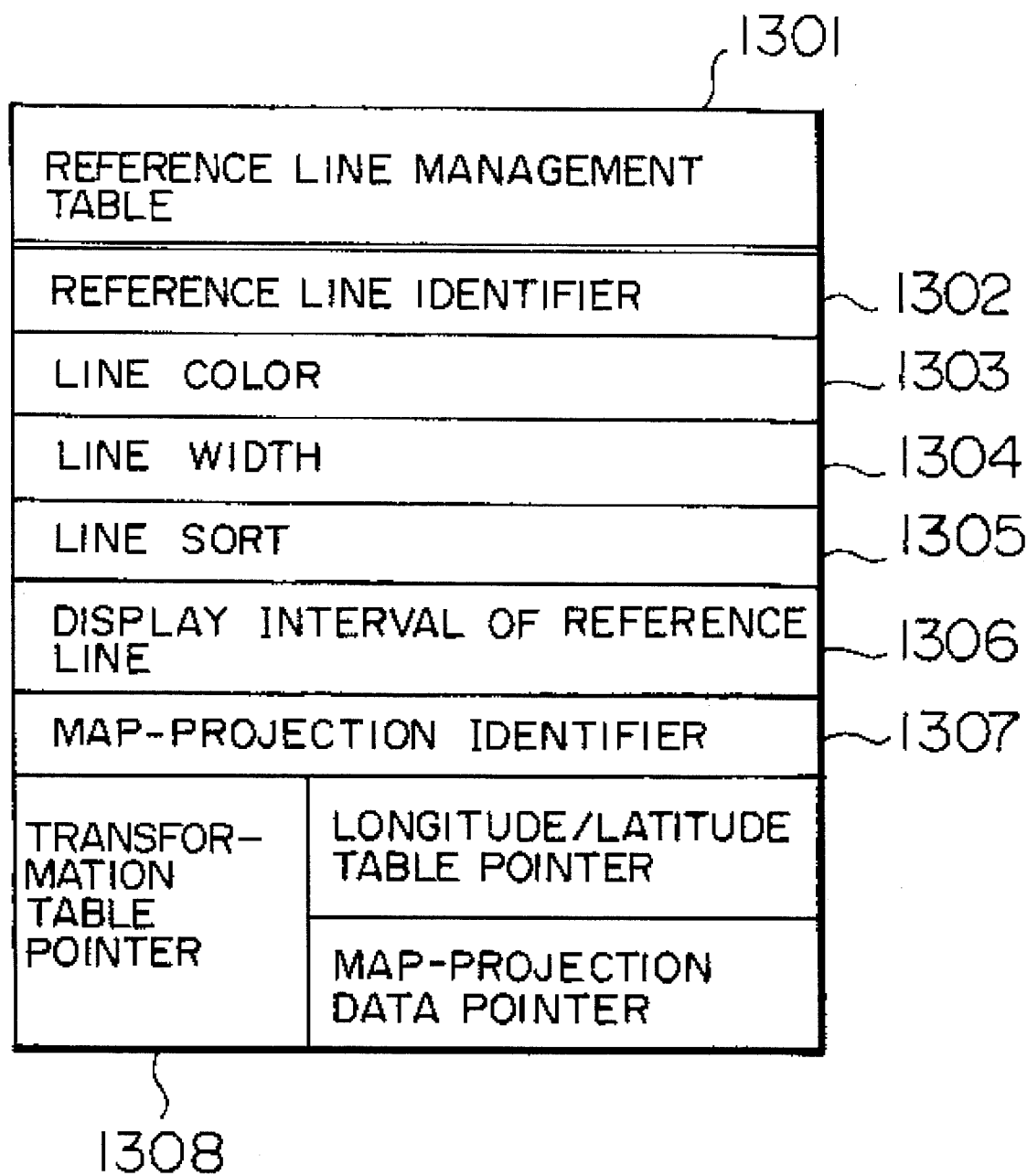
FIG. 13 is an illustration for showing a reference-line management table.

FIG. 13 represents a content of a reference line management table. Also as to the reference line, since the management data is independent from the generation process similar to the map projection transformation, various sorts of the reference lines can be easily handled. The reference line management table 1301 is constructed of an identifier 1302 for the reference line; a line color 1303 of the reference line; a line width 1304; a sort of line 1305; a display interval 1306 of the reference line; and an identifier 1307 of a map projection to handle the reference amount; and also a transformation table pointer 1308. The transformation table pointer 1308 is similar to the transformation table pointer 616 of the coordinate transformation management data table.

Figure 14:
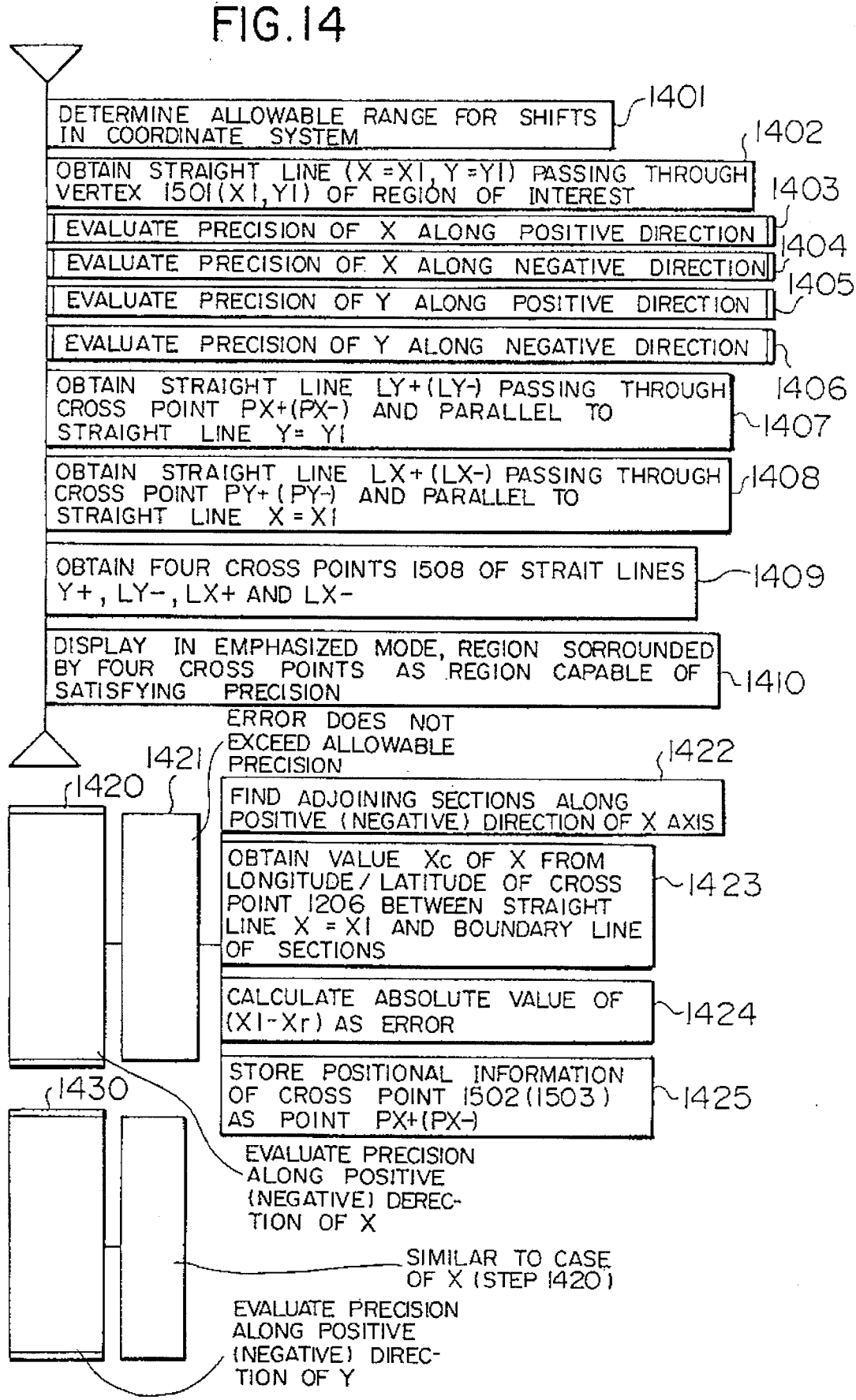
FIG. 14 is a flow chart (PAD diagram) for explaining a process for evaluating precision.
Figure 15:
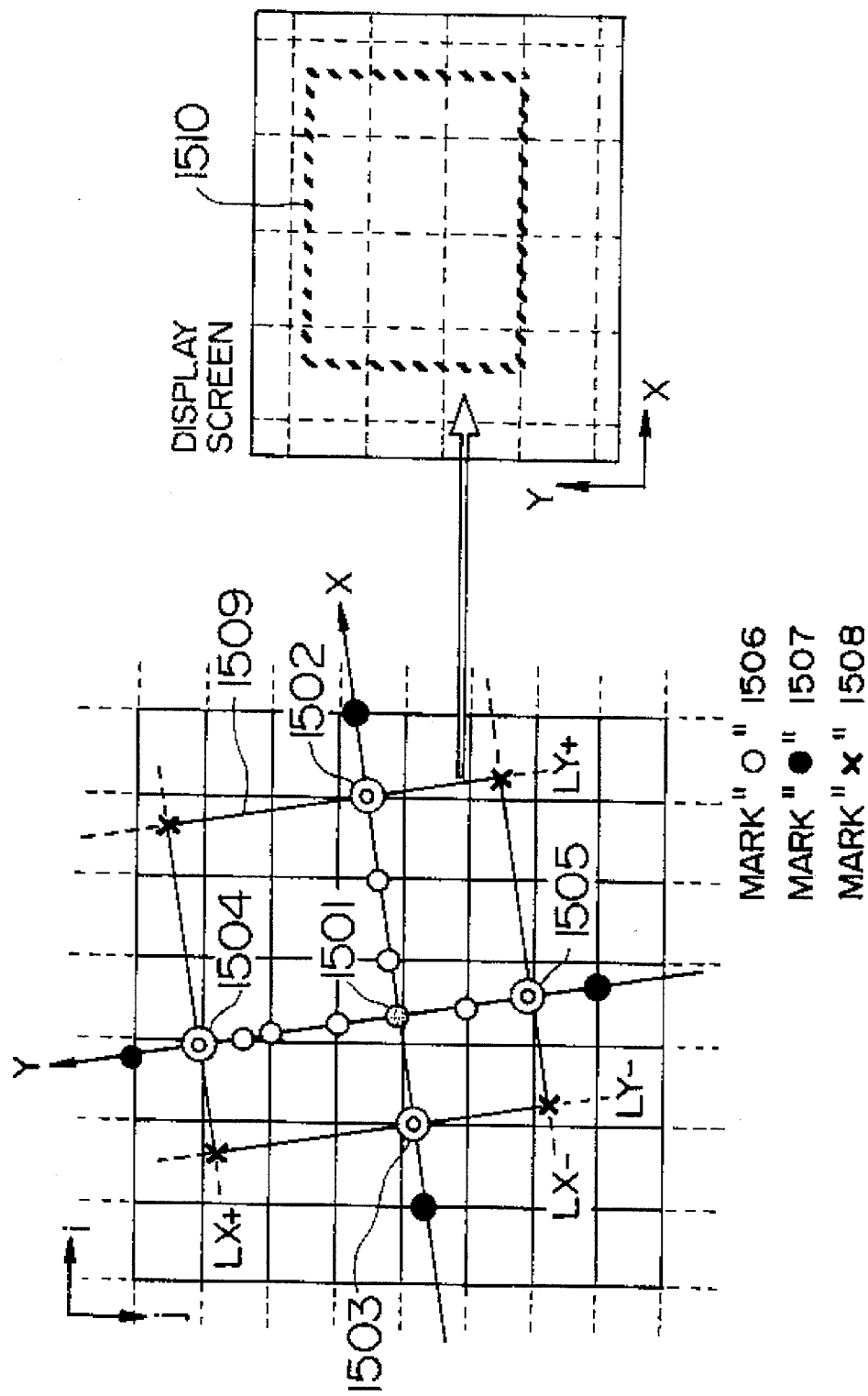
FIG. 15 is a schematic diagram for explaining a process to evaluate precision; and, FIG. 16 is an illustration for showing a path management table.

Referring now to FIGS. 14 and 15, a method for evaluating precision, according to one preferred embodiment, will be described in case that a map projection has been converted in accordance with a region of interest. In this preferred embodiment, a coordinate value obtained by the suitable transformation is set as a true value, and precision is evaluated by checking a shift between another coordinate value obtained by the uniform transformation and such a coordinate value which has been originally obtained by way of the suitable transformation. That is to say, the comparison between the first-mentioned coordinate value and the second mentioned coordinate value, is performed at points obtained in the following sequence and positioned on the boundary lines in the respective subdivision management units in the region to be converted.

It is assumed that precision is satisfactory until the shift between these coordinate values is within an allowable range. A region having arbitrary precision may be displayed in an emphasis mode by setting the allowable error range in accordance with the following sequence.

FIG. 14 is a flow chart for explaining a process to evaluate precision. From the coordinate transformation formula by the uniform transformation, a straight line having a constant X and a constant Y is determined in the coordinate system (X, Y) of the map projection B to be converted, a cross point between this straight line and a boundary line of a segment, and also a shift in a coordinate value at a cross point position is evaluated. FIG. 15 schematically illustrates a summary of the precision evaluating process.

At a step 1401, an allowable range for a positional shift amount of graphic data is determined. This allowable range of the shift amount (precision in transformation) is determined in accordance with an area of a region of interest (namely, the region of interest owns how many minimum subdivision units) which has been inputted by the user, and also precision in graphic data. If the coordinate transformation table at the region to be converted has not yet been expressed by numeral values, referring to the coordinate transformation management data table 610, a table is formed under control of the table forming program 405. At a step 1402, a straight line (X=X1, Y=Y1) having a constant X and a constant Y is determined from a coordinate value (X1, Y1) of a vertex 1501 positioned at a lower left position of the region of interest. Subsequently, the precision evaluation is carried out along these straight lines. In other words, a point 1501 is set to a starting point, and then the precision evaluation is executed along a positive direction and also a negative direction. At a step 1403, the precision evaluation is carried out along the positive direction of the straight line X=X1 set at the previous step 1402. The adjacent sections to the straight line X=X1 are successively evaluated along the positive direction thereof, and it is shown that the process operations defined from a step 1421 to a step 1427 are executed while the allowable precision can be satisfied. It is now assumed that a cross point with the boundary line which is separated most remote from the region of interest within a range not exceeding the allowable precision, is set to be "PX+".

Reference numeral 1502 indicates "PX+". At a step 1404, the precision evaluation is carried out along the negative direction of the straight line X=X1, which is similar to that of the step 1403. A cross point obtained this precision evaluation is set to be "PX−". Reference numeral 1503 indicates "PX−". At a step 1405, the precision evaluation is performed along the positive direction of the straight line Y=Y1, which is similar to that of the step 1403. A cross point obtained at this evaluation is set to be "PY+". Reference numeral 1504 indicates "PY+". At a step 1406, the precision evaluation is carried out along the negative direction of the straight line Y=Y1, which is similar to that of the previous step 1403. A cross point obtained during this precision evaluation is set to be "PY−". Reference numeral 1505 denotes "PY−". At a step 1407, a straight line LY+ which passes through the cross point "PX+" along the direction of Y=Y1, is obtained, whereas a straight line LY− which passes through the cross point "PX−" along the direction of Y=Y1 is obtained. At a step 1408, a straight line LX+ which passes through the cross point PY+ along the direction of X=X1 is obtained, and also a straight line LX− which passes through a cross point "PY−" along the direction of X=X1 is obtained. At a step 1410, a region 1509 surrounded by the four straight lines LX+, LX−, LY+ and LY−, namely a region whose vertex is the cross point obtained at the step 1409, is represented in the emphasized mode as the region capable of satisfying the precision. Reference numeral 1510 indicates a range expressed in the emphasized mode on the display screen.

The steps 1420 and 1430 are a flow chart for explaining the precision evaluation process operations executed from the steps 1403 to 1406. At the step 1420, the precision evaluation process for the straight line X=X1 is performed, whereas at the step 1430, the precision evaluation process similar to that of the step 1420 is performed with respect to the straight line Y=Y1.

A process operation of a step 1421 implies that process operations defined from a step 1422 to a step 1425 are repeatedly performed unless the shift does not exceed the allowable range. At a step 1422, positional information on a cross point 1506 between the straight line X=X1 and the boundary line is recorded. At the beginning, a point 1501 is recorded. After second times, the cross points which have been obtained during the previous time are recorded. At a step 1423, a subdivision management unit adjacent to the positive (negative) direction of the straight line is found. At a step 1424, a longitude and a latitude of a cross point between the straight line X=X1 and the boundary line of the unit section found at the step 1423 are obtained, and also a coordinate system at a cross point by the flexible transformation is obtained. Since either the longitude, or the latitude is constant on the boundary line of the segment, both the longitude and latitude of the cross point can be easily obtained. The coordinate value Xr is obtained by way of the linear interpolation from the corresponding relationship of the coordinates at the vertexes of the section. At a step 1425, a judgement is made whether or not an absolute value of (X1−Xr) functioning as the shift amount is calculated. If the shift exceeds the allowable range, the cross point obtained during the previous time is set to PX+(PX−), whereby the process operation is completed. Reference numeral 1507 indicates a cross point exceeding the allowable range.

Thereafter, a method for carrying out a map-projection transformation/representation along a path designated by a user, according to a preferred embodiment, will now be described. This method may be applied to such a case that display results are different from each other, depending upon a position of a base point, as in the azimuth map projection. The base points are produced at a constant interval along the path inputted by the user, whereby the map projection transformation is performed and then displayed. If the base point is determined, the map projection transformation/display are executable similar to that of the previous case.

FIG. 16 represents contents of a path management table. A path management table 1601 is constructed of a coordinate value 1603 of a vertex in a path, a quantity of vertex 1602, and also a distance 1604 up to the next vertex. Reference numeral 1603 represents a coordinate value of longitude/latitude of the vertex. Reference numeral 1604 denotes a distance up to the subsequently registered vertex, a value of which may be calculated either from the UTM coordinate value, or a distance between two points on a sphere. In accordance with a method for generating a base point of one preferred embodiment, an accumulated distance among the respective vertexes is obtained from the distance 1604 to each vertex, and then the points on the path are interpolated every predetermined interval, thereby obtaining a base point.

In accordance with the present invention, the maps can be displayed in conformity to correctness in a distance as well as correctness in an azimuth by performing various sorts of map-projection transformation, so that these correct maps can intuitively support user's idea. Also, since the continuities of the graphic data about the adjoining sections can be maintained by linear-interpolating the vertex data every section in case that the various sorts of map projection transformation, and furthermore, the discontinuities of the adjoining zones can be avoided by shifting the zone with respect to the UTM coordinate system corresponding to the local coordinate system, the maps can be displayed without causing inconvenient feeling to a user. As a result, the information representing function of the digital map information system can be improved. It is also possible to provide data on the basis of analysis.

We claim:

1. A digital cartographic system for processing geographic information, comprising:

means for storing at least first graphic data obtained by a first map projection in which said graphic data is divided into management region units based on a longitude and latitude coordinate system;

a first table for storing at least values of coordinates of vertexes of each management region unit according to said first map projection and longitude/latitude coordinate values of the vertexes of each of said management region units;

a second table for storing management information concerning said first map projection and various map projections including a second map projection;

input means for selecting said second map projection to be transformed from said various map projections, and for designating a transformation region;

means for obtaining longitude/latitude coordinate values of vertexes of each management region unit included in said transformation region by reference to said first table, and for transforming obtained longitude/latitude coordinate values into coordinate values of the vertexes of said each management region unit according to said second map projection by assuming that values of said longitude and latitude coordinate system of two vertexes of four vertexes of said each management region unit are identical and by performing linear interpolation based on said management information concerning said second map projection stored in said second table;

means for obtaining coordinated transformation equations for each management region unit included in said transformation region from obtained longitude/latitude coordinate values of the vertexes in said each management region unit included said transformation region according to said first map projection that are stored in said first table and said coordinate values of the vertexes of said each management region unit according to said second map projection, and transforming said first graphic data into second graphic data according to said second map projection; and means for displaying said second graphic data.

2. A digital cartographic system for processing geographic information according to claim 1, wherein said first table, when one of said first and second map projections is a map projection according to a UTM coordinate system, stores coordinate values of vertexes of each management region unit in one zone among zones each having predetermined area in a longitudinal direction, and said first graphic data is transformed by using said coordinate values of vertexes of said each management region unit in one zone, for another transformation region.

3. A digital cartographic system for processing geographic information according to claim 2, wherein when one of said first and second map projections is a map projection according to a UTM coordinate system, and when said transformation region extends over two zones which are located adjacent to each other, said first graphic data is transformed by using said coordinate values of vertexes of said each management region unit in a zone which is obtained by shifting one of said zones by a predetermined angle in said longitudinal direction.

4. A digital cartographic system for processing geographic information according to claim 1, further comprising:

means for producing reference line data of reference lines such as said longitude and latitude coordinate system; and means for outputting said reference line data to said means for displaying such that said reference line data including a plurality of reference lines are displayed so as to be overlapped, when said second graphic data is displayed.

5. A digital cartographic system for processing geographic information according to claim 1, further comprising:

means for designating a path by said input means;

means for sequentially generating base points for transformation along said path designated by a user; and means for outputting results of the map projection transformation to said means for displaying.

6. A digital cartographic system for processing geographic information comprising:

means for storing at least a first graphic data obtained by a first map projection in which said graphic data is divided into units of a region of interest based on a longitude and latitude coordinate system;

a first table for storing at least values of coordinates of vertexes of each unit of the region of interest according to said first map projection and longitude/latitude coordinate values of the vertexes of said each unit of the region of interest;

a second table for storing management information concerning said first map projection and various map projections including a second map projection;

input means for selecting said second map projection to be transformed from said various map projections, and for designating a transformation region;

means for obtaining longitude/latitude coordinate values of vertexes of each unit of the region of interest included in said transformation region by reference to said first table, and transforming obtained longitude/latitude coordinate values into coordinate values of the vertexes of said each unit of the region of interest according to said second map projection, by assuming that values of said longitude and latitude coordinate system of two vertexes of four vertexes are identical, and by performing linear interpolation based on said management information concerning said second map projection;

means for obtaining coordinated transformation equations for said each unit of the region of interest included in said transformation region from said coordinate values of the vertexes in said each unit of the region of interest including said transformation region according to said first map projection that are stored in said first table and said coordinate values of the vertexes of said each unit of the region of interest according to said second map projection, and for transforming said first graphic data into a second graphic data according to said second map projection; and means for displaying said second graphic data.

7. A digital cartographic system for processing geographic information according to claim 6, wherein said first table, when one of said first and second map projections is a map projection according to a UTM coordinate system, stores coordinate values of vertexes of each unit of the region of interest in one zone among zones each having a predetermined area in a longitudinal direction, and said first graphic data is transformed by using said coordinate values of vertexes of each unit of the region of interest in one zone, for another transformation region.

8. A digital cartographic system for processing geographic information, comprising:

means for storing at least first graphic data obtained by a first map projection in which said graphic data is divided into management region units based on a longitude and latitude coordinate system;

a first table for storing at least values of coordinates of vertexes of each management region unit according to said first map projection and longitude/latitude coordinate values of the vertexes of each of said management region units;

a second table for storing management information concerning said first map projection and various map projections including a second map projection;

input means for selecting said second map projection to be transformed from said various map projections, and for designating a transformation region;

means for obtaining longitude/latitude coordinate values of vertexes of each management region unit included in said transformation region by reference to said first table, and for transforming obtained longitude/latitude coordinate values into coordinate values of the vertexes of said each management region unit according to said second map projection by assuming that values of said longitude and latitude coordinate system of two vertexes of four vertexes of said each management region unit are identical and by performing linear interpolation based on said management information concerning said second map projection stored in said second table;

means for obtaining coordinated transformation equations for each management region unit included in said transformation region from obtained longitude/latitude coordinate values of the vertexes in said each management region unit included said transformation region according to said first map projection that are stored in said first table and said coordinate values of the vertexes of said each management region unit according to said second map projection, and transforming said first graphic data into second graphic data according to said second map projection; and means for displaying said second graphic data;

wherein said first table, when one of said first and second map projections is a map projection according to a UTM coordinate system, stores coordinate values of vertexes of each management region unit in one zone among zones each having predetermined area in a longitudinal direction, and said first graphic data is transformed by using said coordinate values of vertexes of said each management region unit in one zone, for another transformation region; and wherein when one of said first and second map projections is a map projection according to a UTM coordinate system, and when said transformation region extends over two zones which are located adjacent to each other, said first graphic data is transformed by using said coordinate values of vertexes of said each management region unit in a zone which is obtained by shifting one of said zones by a predetermined angle in said longitudinal direction.

9. A digital cartographic system for processing geographic information according to claim 1, further comprising:

means for producing reference line data of reference lines such as said longitude and latitude coordinate system; and means for outputting said reference line data to said means for displaying such that said reference line data including a plurality of reference lines are displayed so as to be overlapped, when said second graphic data is displayed.

10. A digital cartographic system for processing geographic information according to claim 1, further comprising:

means for designating a path by said input means;

means for sequentially generating base points for transformation along said path designated by a user; and means for outputting results of the map projection transformation to said means for displaying.

* * * * *